US011327558B2

(12) United States Patent
Brown et al.

(10) Patent No.: US 11,327,558 B2
(45) Date of Patent: May 10, 2022

(54) PHYSICAL GESTURE BASED DATA MANIPULATION WITHIN A VIRTUAL SCENE FOR INVESTIGATING A SECURITY INCIDENT

(71) Applicant: MICROSOFT TECHNOLOGY LICENSING, LLC, Redmond, WA (US)

(72) Inventors: Benjamin Brown, Seattle, WA (US); Mohamed Rouatbi, Redmond, WA (US); Jeffrey Scott Shaw, Cheltenham (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 47 days.

(21) Appl. No.: 16/839,062

(22) Filed: Apr. 2, 2020

(65) Prior Publication Data
US 2021/0311542 A1    Oct. 7, 2021

(51) Int. Cl.
| | | |
|---|---|---|
| *G06F 3/01* | (2006.01) | |
| *G06F 16/245* | (2019.01) | |
| *G06F 3/0486* | (2013.01) | |
| *G06F 3/04883* | (2022.01) | |
| *G06T 11/00* | (2006.01) | |
| *H04L 29/06* | (2006.01) | |

(52) U.S. Cl.
CPC ............ *G06F 3/011* (2013.01); *G06F 3/0486* (2013.01); *G06F 3/04883* (2013.01);
(Continued)

(58) Field of Classification Search
CPC ...... G06F 3/011; G06F 16/245; G06F 3/0486; G06F 3/04883; G06F 3/017; G06T 11/00;
(Continued)

(56) References Cited

U.S. PATENT DOCUMENTS 9,024,844 B2 * 5/2015 Vaught .................... G06F 3/013
345/8
10,068,089 B1 * 9/2018 Shavell ............... H04L 63/1433
(Continued)

FOREIGN PATENT DOCUMENTS

WO    2019173079 A1    9/2019

OTHER PUBLICATIONS

"Exploring the Design Space of Gestural Interaction with Active Tokens through User-Defined Gestures", Valdes et al., CHI 2014 (Year: 2014).*
(Continued)

*Primary Examiner* — Jennifer N Welch
*Assistant Examiner* — Kc Chen
(74) *Attorney, Agent, or Firm* — Newport IP, LLC; Jacob P. Rohwer

(57) ABSTRACT

Disclosed herein is a system for facilitating fast and intuitive investigations of security incidents by responding to physical gestures performed by security analysts within a virtual scene. A query triggers an alert for detecting security incidents that occur with respect to computing resources. Following the alert, the security analyst dons a Near-Eye-Display (NED) device and is presented with a virtual scene having control elements representing various data sets and/ or data analysis operations relevant to a security incident. The security analyst investigates the security incident by performing hand motions to "grab-and-drag" control elements representing data sets. The security analyst may also perform hand motions to "tap on" control elements that represents a data analysis operation. Responsive to the hand motions, the system performs data analysis operations and displays a result within the virtual scene. Then, the security analyst performs another hand motion to remediate any threat caused by the security incident.

18 Claims, 10 Drawing Sheets

(52) U.S. Cl.
CPC ............ *G06F 16/245* (2019.01); *G06T 11/00* (2013.01); *H04L 63/10* (2013.01); *H04L 63/1425* (2013.01); *H04L 63/1441* (2013.01)

(58) Field of Classification Search
CPC .. H04L 63/10; H04L 63/1425; H04L 63/1441
See application file for complete search history.

(56) References Cited

U.S. PATENT DOCUMENTS

| | | | | |
|---|---|---|---|---|
| 2013/0031613 | A1* | 1/2013 | Shanabrook | G06F 21/6227 726/4 |
| 2015/0172302 | A1* | 6/2015 | Conlon | H04L 63/1408 726/23 |
| 2015/0205840 | A1* | 7/2015 | Yerli | G06Q 10/06 707/722 |
| 2016/0212171 | A1 | 7/2016 | Senanayake et al. | |
| 2018/0159851 | A1 | 6/2018 | Ogrinz et al. | |
| 2020/0005539 | A1* | 1/2020 | Hwang | G02B 27/0172 |
| 2020/0117529 | A1* | 4/2020 | Qiao | G06F 16/9024 |
| 2020/0319775 | A1* | 10/2020 | Pitelka | G06F 3/04842 |

OTHER PUBLICATIONS

"International Search Report and Written Opinion Issued in PCT Application No. PCT/US21/018077", dated Apr. 21, 2021, 13 Pages.

* cited by examiner

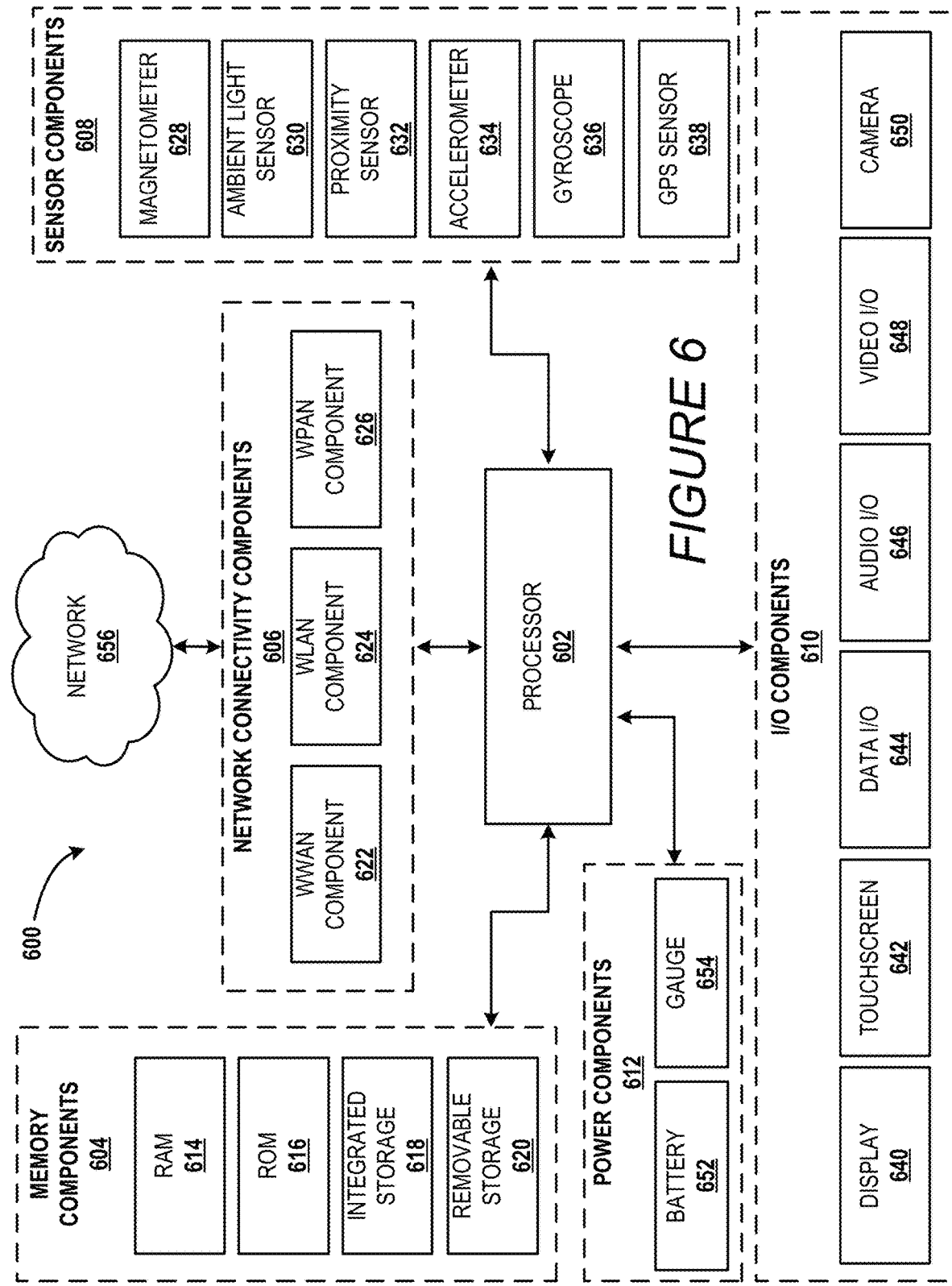

PHYSICAL GESTURE BASED DATA MANIPULATION WITHIN A VIRTUAL SCENE FOR INVESTIGATING A SECURITY INCIDENT

BACKGROUND

Achieving computer security is important to business enterprises that provision internet-based services to expansive networks of client devices and user accounts. As business enterprises increase the volume of sensitive data and services that are accessible to employees online, the volume and sophistication level of online threats to these sensitive data and services also increases. Online threats are typically managed via dedicated security management systems that provide security analysts with security alerts in response to potential security incidents as defined by predefined queries. Security analysts then investigate individual potential security incidents using sophisticated analytical tools that are provided via the security management systems. Based on the outcome of the investigations, the security analysts take appropriate actions to remediate the identified security incidents and neutralize the online threats.

Conventional user-input techniques for the analytical tools provided via security management systems are cumbersome both to learn and to implement. For example, even for experienced security analysts that are familiar with the data structure(s) and/or table query language(s) utilized by the analytical tools, common investigative tasks such as data consumption, query building and modification, and graph formation are difficult and time-consuming. Furthermore, these conventional user-input techniques are predominantly based on strings of textual code which are not readily comprehensible with a high degree of intuitiveness. These drawbacks of conventional user-input techniques generally increase the average time-to-remediation that it takes a security analyst to neutralize an online threat. The longer that online threats remain active the more likely that sensitive computing resources will be compromised. It is with respect to these and other considerations that the disclosure made herein is presented.

SUMMARY

The techniques disclosed herein enable systems to facilitate fast and intuitive data manipulation within a virtual scene by tracking and responding to physical gestures that are performed by a security analyst. These techniques help the security analyst quickly and intuitively investigate a potential security incident associated with a computing resource. For example, suppose an alert is triggered by a predefined query that is designed to detect potential security incidents (e.g., "brute force" attacks) as they occur with respect to an enterprise's computing resources. Upon receiving the alert, the security analyst may immediately don a Near-Eye-Display (NED) device and be presented with a virtual scene that includes graphical control elements representing various data sets and/or data analysis operations relevant to the potential security incident. The data sets may include logs of computing events such as failed and/or successful login attempts that have occurred across the enterprise's computing resources within some relevant time frame. The data analysis operations may include any suitable computing operations for parsing, searching, or otherwise analyzing the data sets to investigate potential security incidents.

While presenting the virtual scene to the security analyst, the system tracks physical gestures that are being performed by the security analyst (e.g., via an environmental tracking sensor installed within the NED device). Physical gestures may include the security analyst performing a deliberate hand motion that is designed to "grab-and-drag" a graphical control element that represents a data set or to "tap on" a graphical control element that represents a data analysis operation. These techniques provide the security analyst with user-inputs that are highly intuitive and quick-to-implement, thereby enabling the security analyst to implement more efficient and effective actions to handle the potential security issue.

In an exemplary implementation, a security management system continuously and/or periodically runs a query against an event log into which data sets from an enterprise's computing resources are compiled. In general terms, these data sets define records of computing events and associated properties that have occurred at the enterprise's computing resource(s). For example, an individual record within a data set may correspond to a failed attempt to log into a user account and/or initialize a virtual machine. As another example, an individual record may correspond to the creation of a new user account (e.g., within an enterprise's director/domain) via an administrator account that has been logged into from an unfamiliar and/or suspicious Internet Protocol address (IP address). By running the query, the event management system may identify a security incident based on criteria of the query being satisfied. As a specific example, the query may be designed to detect potential "brute force" attacks by identifying if a threshold number of failed login attempts originate from a particular IP address and/or against a particular user account within a short period of time. The identification of the security incident may trigger an alert being sent to a security analyst.

After identifying the security incident, the security management system may cause a near-eye-display (NED) device (e.g., a Head-Mounted-Display device) to render a virtual scene to assist the security analyst in investigating the security incident. The NED device can be used for augmented reality (AR) and/or virtual reality (VR) applications. In implementations where the NED device is an AR-type Head Mounted Device (HMD) device, a display component may protrude into the security analyst's field of view to generate virtual content that augments or supplements the security analyst's view of a real-world environment. For example, if the security analyst is positioned in front of a traditional computer monitor, the NED device may render a virtual scene that includes virtual items (e.g., computer generated images) that are composited over and/or positioned surrounding the computer monitor. In this way, the security management system may leverage the NED device to provide the security analyst with a practically infinite "digital" canvas to use while investigating a potential security incident. Furthermore, the security analyst's use of the NED device does not interfere with the security analyst's ability to view and utilize the traditional computing monitor.

The virtual scene rendered by the NED device includes graphical control elements that represent various data sets and/or computing functions that may be useful to the security analyst in investigating the potential security issue. For example, the NED device may render virtual items that represent data sets from the event log and/or data analysis operations that are usable to provide insights into these data sets. Thus, the security analyst may benefit from being presented with vast amounts of information within the virtual scene while concurrently being presented with other information on the traditional computer monitor (e.g., a desktop LCD-type monitor).

The NED device may deploy a built-in environmental tracking sensor to track physical gestures that are performed by the security analyst. These physical gestures may serve as user-inputs to the security management system in addition to any other user-input provided via a physical hardware keyboard or mouse. Stated plainly, the security analyst may perform hand motions, tilt her head, or any other suitable gesture to manipulate or otherwise interact with the graphical control elements being rendered in the virtual scene. To illustrate this point, suppose that the virtual scene includes a first graphical control element that represents a first data set and a second graphical control element that represents a second data set. The security analyst may place a hand over the first graphical control element with only the index and middle finger extended. Here, the security management system may interpret this gesture as a user-input instruction for "virtually" sliding or moving the first graphical control element. Then, the security analyst may move the hand while the security management system continuously monitors this motion and causes the first graphical control element to "track" along with the hand within the virtual scene. Thus, from the visual perspective of the security analyst, the graphical representation of the first data set (i.e., the first graphical control element) is being dynamically dragged through the virtual scene.

In some implementations, the security management system may be configured to expose a listing of available data analysis operations in response to the security analyst "virtually" sliding the first graphical control element over the second graphical control element. For example, suppose that the security management system can perform three different data analysis operations to analyze aspects of the first data set with respect to the second data set. Exemplary data analysis operations may include, but are not limited to, returning the intersection of two or more data sets (e.g., denoted by "A∩B" where each of A and B represent a data set), returning the union of two or more data sets (e.g., denoted by "A∪B"), and/or returning the symmetric difference of two or more data sets (e.g., denoted by "AΔB"). In this way, the security analyst can intuitively drag the first graphical control element over the second graphical control element and then select from an appropriate set of data analysis operations to analyze these two data sets with respect to one another. Furthermore, the physical gestures performed by the security analyst are not limited to interacting with the virtual scene—rather in various implementations the security analyst may perform various deliberate physical gestures to interact with items being presented on the traditional computer monitor. For example, the security analyst may gesture over a graphical representation of a data set on the monitor and then motion off the monitor to cause a virtual representation of the data set to be added into the virtual scene.

Ultimately, the security management system responds to the physical gestures being performed by the security analyst by deploying the selected data analysis operations with respect to the appropriate data sets. For example, if the security analyst drags a graphical control element representing data set "A" over another graphical control element representing data set "B" and is then presented with and "virtually" taps (e.g., to select) a "∩" symbol, the security management system may seamlessly calculate and then graphically present the intersection of A and B. In some implementations, the security management system may respond to certain detected movements and/or gestures performed by the security analyst by rendering more or less information within the virtual scene. For example, at a first time $T_1$, the security management system may cause the NED device to render a virtual graphic representing one or more computing events that have occurred with respect to a particular computing resource (e.g., a user account, a server terminal, etc.). Then, at a second time $T_2$, the security management system may detect a motion and/or physical gesture that is performed by the security analyst and respond by adjusting the virtual graphic.

As a specific but non-limiting example, the security management system may detect (e.g., via head tracking sensors installed within the NED device) that the security analyst has tilted her head slightly while her gaze direction is toward the virtual graphic representing the one or more computing events. Then, responsive to this head tilting movement and/or detected gaze direction, the virtual graphic may be dynamically updated to show an offset side view of a stack of multiple virtual graphics (e.g., with the originally shown virtual graphic on top of the stack). This may be beneficial for conveying addition information such as, for example, time dimensionality information associated with when certain ones of the computing events occurred.

Thus, the techniques described herein enable a security analyst to quickly provide user-inputs that are highly intuitive and that do not require typing or otherwise manipulating the complex data structures and/or table query languages which underly the actual data analysis operations being performed. Thus, the techniques described herein enable the security analyst to implement more efficient and effective actions to handle the potential security issue which reduces both the learning curve and the average time-to-remediate potential security incidents.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 6 is a computer architecture diagram illustrating a computing device architecture for a computing device capable of implementing aspects of the techniques and technologies presented herein.

DETAILED DESCRIPTION

The following Detailed Description discloses technologies that track and respond to physical gestures that are performed by a security analyst to facilitate fast and intuitive data manipulation and analysis within a virtual scene. This enables the security analyst to quickly and intuitively investigate potential security incidents that occur on an enterprise's computing resources. For example, upon receiving an alert of a potential security incident, the security analyst is presented with a virtual scene via a Near-Eye-Display (NED) device. The virtual scene includes graphical control elements that represent data sets and data analysis operations which are useful for investigating the potential security incident. While the virtual scene is being presented, the system tracks physical gestures that are being performed by the security analyst. For example, the security analyst may perform a deliberate hand motion that is designed to "grab-and-drag" a graphical control element that represents a data set. Additionally, or alternatively, the security analyst may perform a hand motion to "tap on" a graphical control element that represents a data analysis operation. These techniques enable the security analyst to provide a security management system with user-inputs that are highly intuitive and quick-to-implement. Consequently, the systems described herein enable the security analyst to quickly complete investigations of potential security issues and, if appropriate, neutralize any identified security threats.

Various examples, scenarios, and aspects of the disclosed techniques are described below with reference to FIGS. 1-6.

Figure 1:
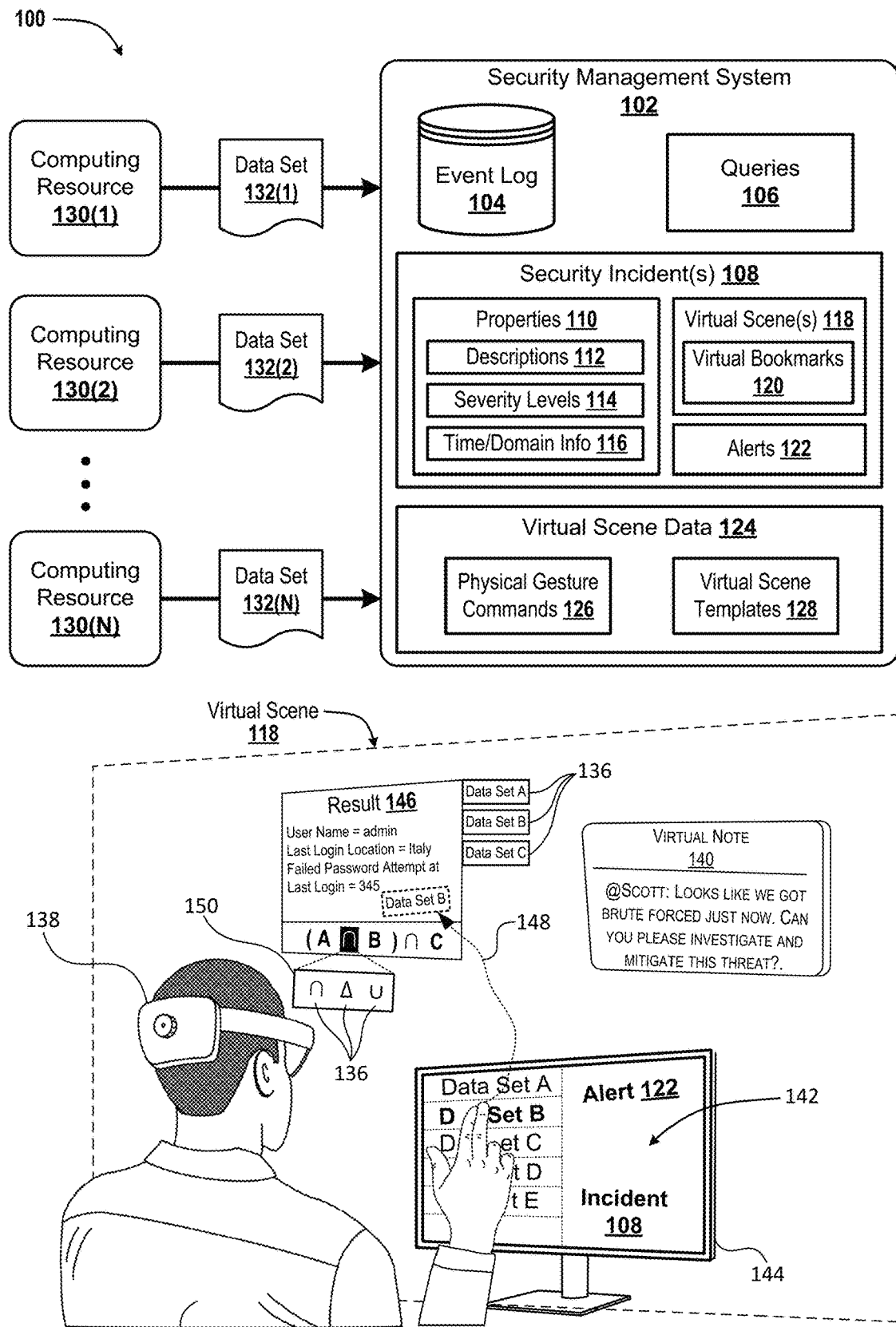
FIG. 1 illustrates a virtual scene which is being generated by a Near-Eye-Display (NED) device and with which a security analyst may interact with via physical gestures in order to quickly and intuitively investigate security incidents that occur with respect to various computing resources.

FIG. 1 is a diagram illustrating an example environment 100 in which a security management system 102 is configured to facilitate fast and intuitive data manipulation via a virtual scene 118 that presents information associated with a potential security incident 108. The security management system 102 is configured to track physical gestures that are performed by a security analyst 134 and respond to these physical gestures by dynamically updating the information that is being displayed within the virtual scene 118. As illustrated, the virtual scene 118 may be rendered by a Near-Eye-Display (NED) device 138 that is being worn by a security analyst 134. The virtual scene 118 includes graphical control elements 136 that represent various data sets and/or data analysis operations that are useful to the security analyst 134 for investigating the potential security incident 108.

FIG. 1 illustrates a virtual scene 118 which is generated by a NED device 138 and with which a security analyst 134 may interact with via physical gestures to quickly and intuitively investigate security incidents that occur with respect to various computing resources 130(1)-130(N) (which may be collectively referred to herein as computing resources 130). In the context of the present disclosure, the letter "N" when used within a parenthetical (e.g., 130(N)) is used to denote a positive integer number such as three, five, ten, etc. As illustrated, individual ones of the computing resources 130 continuously and/or periodically transmit (e.g., via one or more networks) data sets 132 to the security management system 102. Exemplary security management systems 102 may include, but are not limited to, Security Information and Event Management (SIEM) software products and services. Exemplary computing resources 130 include, but are not limited to, user accounts, software applications, individual servers, server clusters, physical machines (e.g., a laptop computer, smartphone, Internet-of-Things (IoT) thermostat, etc.), virtual machines, and any other type of computing resource which may experience security incidents 108.

Generally described, the data sets 132 include computing event logs or records-compilations that define properties of individual computing events (or groups of computing events for that matter) that have occurred with respect to individual ones of the computing resources 130. For example, the data sets 132 may define a time at which a login attempt occurred with respect to the first computing resource 130(1), an indication of whether the login attempt was successful or failed, a user account that the failed login attempt was attempting to gain access to, a computing device identifier from which the failed login attempt originated, an IP address from which the field login attempt originated, and so on. Individual data sets 132 may be connected natively via "out-of-the box integration with the security management system 102. Additionally, or alternatively, individual data sets 132 may be connected externally via an application programing interface "API" of the security management system 102. Exemplary data 132 sets include, but are not limited to, AMAZON WEB SERVICES (AWS)—CLOUD-TRAIL, AZURE ACTIVE DIRECTORY, OFFICE 365, etc.

The security management system 102 may aggregate the data sets 132 into an event log 104 that that defines information and/or properties about computing events that have occurred across an enterprise's vast network of computing resources 130. In order to identify "potential" security incidents 108, the security management system 102 continuously and/or periodically runs queries 106 against the event log 104 to identify when one or more computing events occur that individually and/or collectively satisfy certain criteria defined by individual queries 106. As a specific example, a query 106 may be designed to detect potential "brute force" attacks by identifying if a threshold number of login attempts originate from a particular IP address and/or against a particular user account within a predetermined length of time (e.g., one hour, one day, etc.). In this example, the potential security issue 108 is associated with a cyberattack that attempts to gain access to computing resources 130 by "cracking" user passwords. An attacker can run programs on its own device to use different methods to access user accounts or other computing resources 130. For instance, the attacker can use "brute force" attacks to guess the passwords or compare various word combinations against a dictionary file to obtain the passwords.

After gaining access to the computing resources 130, the attacker can perform various malicious actions on the computing resource 130. For example, the attacker might install malware or other types of malicious software on the accessed computing resources 130. Malicious software might, for example, instruct the computing resources 130 to communicate with and execute commands from a network server under the control of an attacker. As another example, after gaining access to an administrative account via a "brute force" attack, an attacker might perform a "lateral move" by creating one or more new user accounts within a compromised domain. Then, even if the attacker's access to the administrative account is identified and terminated by a security analyst, the attacker may still be able to infiltrate the compromised domain via the newly created user account (e.g., which the domain owner may be temporarily unaware of). The compromised computing resources 130 can cause further damage to uncompromised computing resources 130 such as collecting sensitive information or distributing spam. Accordingly, upon various criteria of a query 106 being satisfied, it may be appropriate for the security analyst 134 to investigate the security incident 108 to identify and perform any actions needed to mitigate a threat.

As illustrated, the security incidents 108 may be associated with properties 110, virtual scenes 118, and/or alerts 122. The properties 110 may include descriptions 112 of various computing events that have occurred with respect to the computing resources 130, severity levels 114 indicating a priority of investigating and resolving individual security incidents 108, and time/domain information 116 that indicates a time and date at which individual computing events occurred and from which domains the computing events originated from and/or were directed to. In some implementations, the virtual scenes 118 may uniquely correspond to individual ones of the security incidents 108 and may be stored on the security management system 102 to enable the security analyst 134 to periodically close out of and then subsequently return to the virtual scene 118. In this way, the security analyst 134 can continue working on an investigation of the security incidents 108 right where he or she left off following an interruption or a break. Additionally, or alternatively, the virtual scenes 118 may be shared between users to enable other persons to observe the security analyst 134 investigating the security incident 108. Furthermore, in some implementations, the security analysts 134 may be viewing and/or interacting with (e.g., via physical gestures or otherwise) information within the virtual scene 118 concurrently with one or more other persons in a collaborative investigation session.

As further illustrated, the identification of the security incident 108, based on the running of the query 106, may trigger an alert 122 being generated by the security management system 102 and transmitted to the security analyst 134. The alert 122 may be provided to the security analyst 134 via an email message, a dashboard interface generated by the security management system 102, or via any other suitable communication mechanism. In some implementations, the security analyst 134 may be presented with the virtual scene 118 as a result of the alert 122. As shown in FIG. 1, the virtual scene 118 may include numerous different graphical control elements 136 that represent various different ones of the data sets 132. For example, as illustrated, individual graphical control elements 136 represent each of a "Data Set A," "Data Set B," and a "Data Set C." Additionally, or alternatively, the virtual scene 118 includes numerous different graphical control elements 136 that represent various different data analysis operations that may be deployed to analyze the data sets 132 in order to investigate the security incident 108 which triggered the alert 122. The data sets 132 may include logs of computing events such as failed and/or successful login attempts that have occurred across the enterprise's computing resources 130 within some relevant time frame. The data analysis operations may include any suitable computing operations for parsing, searching, or otherwise analyzing the data sets to investigate potential security incidents 108.

As further illustrated, other graphics representing one or more of the data sets 132 and/or data analysis operation may be concurrently displayed to the security analyst 134 via a screen-bound scene 142 that is being rendered by a display screen 144 (e.g., an LCD monitor). Thus, due to the security analyst 134 being positioned in front of a traditional computer monitor (i.e., the display screen 144), the virtual scene 118 that is rendered by the NED device 138 may include virtual items (e.g., computer generated images) that are composited over and/or positioned surrounding the screen-bound scene 142. In this way, the security management system 102 may leverage the NED device 138 to provide the security analyst 134 with a practically infinite "digital" canvas to use while investigating a security incident 108. Furthermore, the security analyst's 134 use of the NED device 138 does not interfere with his or her ability to view and utilize the display screen 144.

As further illustrated, the security management system 102 includes virtual scene data 124 that defines various physical gesture commands 126 that the security analyst 134 can perform to provide user-inputs in association with the virtual scene 118. Thus, while the NED device 138 is presenting the virtual scene 118 to the security analyst 134, various physical gestures that are performed by the security analyst 134 may be tracked (e.g., via an environmental tracking sensor installed within the NED device 138) and responded to via real-time updates to the virtual scene 118 and/or screen-bound scene 142. An exemplary physical gesture might include the security analyst 134 performing a "grab-and-drag" hand motion that mimics grabbing and then dragging an individual graphical control element 136. Thus, the physical gestures that are performed by the security analyst 134 may be designed to interact with information and/or graphical control elements 136 that are being rendered by the NED device 138 as part of the virtual scene 118. Additionally, or alternatively, the physical gestures that are performed by the security analyst 134 may be designed to interact with information and/or graphical control elements that are being rendered by the display screen 144 as part of the screen-bound scene 142. Physical gestures performed by the security analyst 134 serve as user-inputs to the security management system 102 and, in some implementations, supplement other user-inputs provided via a physical hardware keyboard or mouse (not shown). Stated plainly, the security analyst may perform hand motions, tilt her head, or any other suitable gesture to manipulate or otherwise interact with the graphical control elements being rendered in the virtual scene.

In the specific but non-limiting example illustrated in FIG. 1, the security analyst 134 is shown to place a hand over a graphical representation of a particular data set 132 (e.g., named "Data Set B") with only the index and middle finger extended. This combination of hand placement and gesture (i.e., the selective extension of the index and middle finger) may serve as user input indicating that the security analyst 134 intends to "drag" (or otherwise manipulate/interact with) this particular data set 132. Here, the security management system 102 interprets this gesture as a user-input instruction for "virtually" sliding or moving the graphical representation of "Data Set B." As further illustrated, the security analyst 134 drags the graphical representation of "Data Set B" off of the screen-bound scene 142 and into the virtual scene 118. More specifically, the security analyst 134 drags "Data Set B" along a path 148 onto an existing item of virtual information that represents a result 146 of an already performed data analysis operation. In this way, the security analyst 134 may move the hand while the system 100 continuously monitors this motion and causes the "Data Set B" graphic to "track" along with the hand within the virtual scene 118. Thus, from the visual perspective of the security analyst 134 the "Data Set B" graphic is being dynamically dragged through the virtual scene.

In the illustrated implementation, the security management system 102 exposes a listing of available data analysis operations 150 in response the security analyst "virtually" dragging the graphical representation of a particular data set 132 over the result 146. For example, suppose that the security management system 102 can perform three different data analysis operations to analyze aspects of "Data Set B" with respect to "Data Set A" and/or "Data Set C"—which have been utilized in determining the result 146. Here these data analysis operations include, returning the intersection of two or more data sets (e.g., denoted by "∩" within the listing 150), returning the union of two or more data sets (e.g., denoted by "∪"), and/or returning the symmetric difference of two or more data sets (e.g., denoted by "Δ"). In this way, the security analyst 134 can intuitively drag the graphical control element with respect to other information being displayed within the virtual scene 118 to trigger exposure of an appropriate set of data analysis operations. Then, the security analyst 134 may select one or more data analysis operations from the listing 150 to cause the result 146 to be updated accordingly.

Ultimately, the security management system 102 responds to the physical gestures being performed by the security analyst 134 by deploying the selected data analysis operations with respect to the appropriate data sets 132. For example, since the security analyst 134 drags a graphical control element representing data set "B" over the result 146 and is then presented with and "virtually" taps (e.g., to select) a "∩" symbol, the security management system 102 may seamlessly update the initially displayed result for "A∩C" to a new result for "(A∩B) C ∩C."

In some embodiments, the system 100 enables the security analyst 134 to add virtual notes 140 into the virtual scene 118. As illustrated for example, the security analyst 134 has added a virtual note to the right of the result 146 within the virtual scene 118. Here, the virtual note 140 recites: "@Scott: Looks like we got brute forced just now. Can you please investigate and mitigate this threat?" In some implementations, individual virtual notes 140 may be addressed to specific persons (e.g., via the at-mentioning of Scott—@Scott) to cause aspects of a corresponding virtual scene 118 to be presented to the specifically address persons.

In some implementations, the virtual scene data 124 further includes data defining one or more virtual scene templates 128 that the security analyst 134 can select from. An individual virtual scene templates 128 may be designed for use with particular types of security incidents 108. As a specific but non-limiting example, a particular "Brute Force" virtual scene template 128 may be designed to be automatically deployed in response to an alert 122 of a "Brute Force" attack likely having occurred. By deploying the "Brute Force" virtual scene template 128, the security analyst 134 may be presented with a virtual scene 118 that is automatically generated and/or populated with relevant information to aid the security analyst 134 in his or her investigation of the potential security incident 108.

FIGS. 2A through 2D are related figures that illustrate various "hand-based" physical gesture commands that may be performed by the security analyst 134. Individual ones of FIGS. 2A through 2D further illustrate various virtual scenes 118 and screen-bound scenes 142 that may be displayed as a result of the "hand-based" physical gesture commands. For purposes of FIGS. 2A through 2D, the virtual scenes 118 correspond to any portion of the figures that are outside of the screen-bound scenes 142 that are being rendered by the display screen 144. FIGS. 2A through 2D are described in the context of a scenario where a security analyst 134 initially applies a virtual scene template 128 to a detected security incident 108 and then subsequently performs various hand-based gestures to interact with the resulting virtual scene 118. Although not limited to such a scenario, an appreciation of various aspects of the disclosed techniques may be readily gained through the ensuing discussion of an example in such a context. It should be appreciated, however, that the techniques described herein are not necessarily limited to such a scenario. Rather, the techniques described herein are widely applicable to many other situations to facilitate physical gesture-based user inputs with respect to a virtual scene 118 and/or a screen bound scene 142 for the purposes of investigating potential security incidents 108.

Figure 2A:
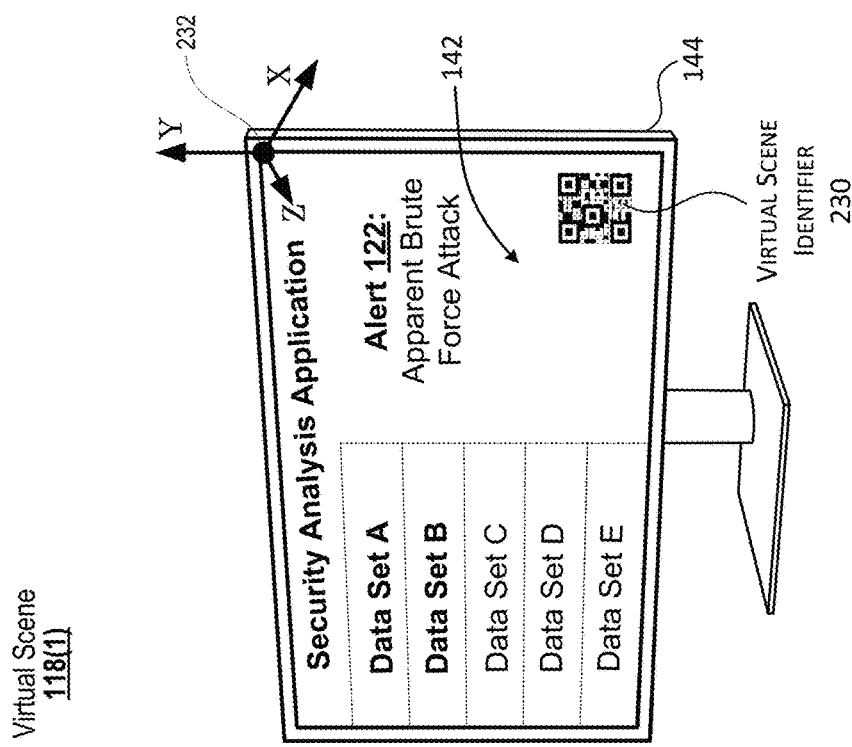
FIG. 2A illustrates a specific scenario in which the NED device is rendering a first instance of a virtual scene in association with a potential security incident that has triggered an alert.
Figure 2A:
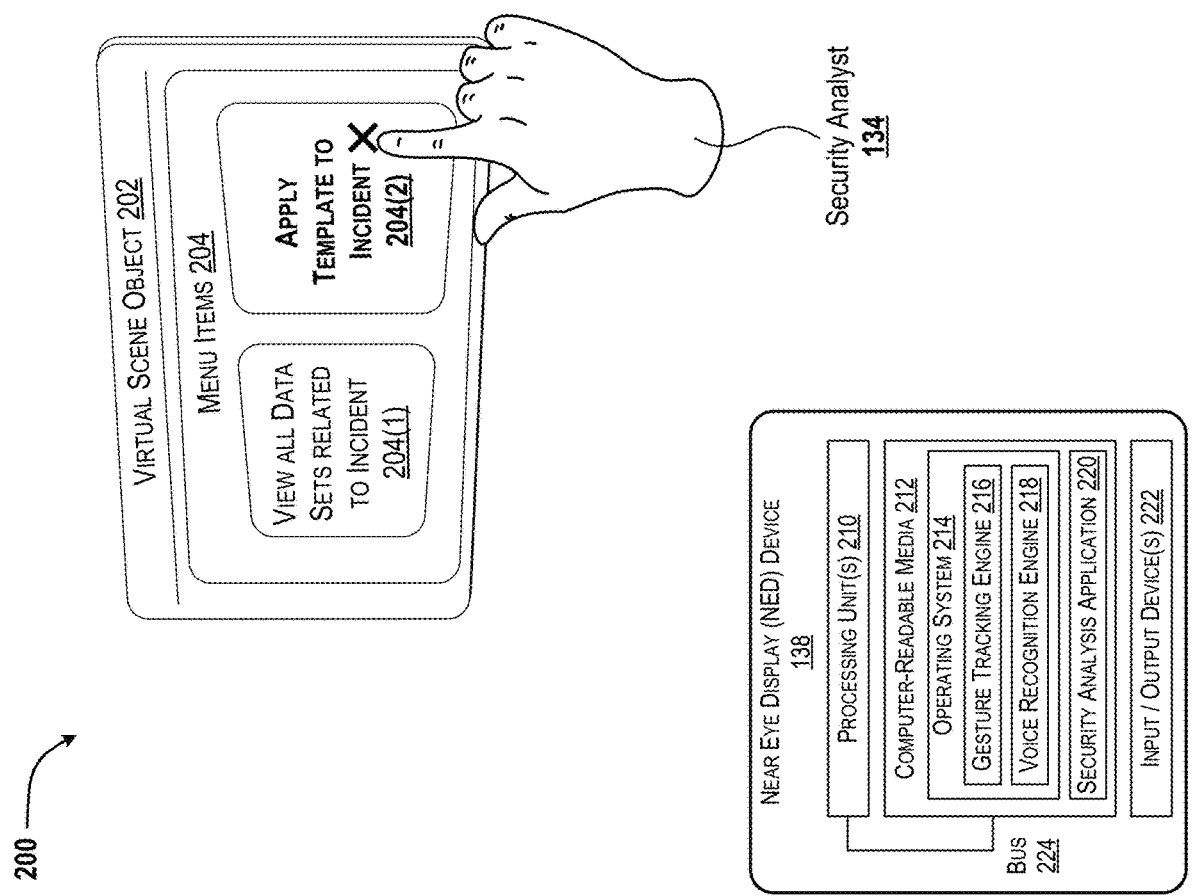

The virtual scenes 118 shown in FIGS. 2A through 2D are rendered by the NED device 138 described in relation to FIG. 1. An exemplary such NED device 138 may include one or more logic devices and one or more computer memory devices storing instructions executable by the logic device(s) to deploy functionalities described herein. As illustrated in FIG. 2A, for example, the NED device 138 includes one or more processing units 210, one or more computer-readable media 212 storing an operating system (OS) 214 and a security analysis application 220 that is executable by the OS 214 to perform functionalities described herein in relation to the security management application 102. The computer-readable media 212 may further include other data such as, for example, the event log 104, the queries 106, security incidents 108, the virtual scene data 124, and so on. The OS 214 may further include a gesture tracking engine 216 configured to receive gesture tracking data from one or more sensors (e.g., a native environmental tracking sensor that is built-into the NED device 138) and, based thereon, determine one or more physical gestures performed by the security analyst 134. The OS 214 may further include a voice recognition engine 218 for receiving and analyzing audio data that includes a voice of the security analysts 134 (e.g., that is captured by a microphone of the NED device 138). The voice recognition engine 218 may facilitate an ability of the system 100 to receive voice-input commands from the security analyst

134. Furthermore, the NED device 138 may include one or more input/output (I/O) devices 222 such as, for example, a display unit for rendering the virtual scenes 118, environmental tracking sensors (e.g. depth sensors that utilize structured light or computer vision techniques to map a real-world environment surrounding the NED device 138), etc. The components of the NED device 100 are operatively connected, for example, via a bus 224, which can include one or more of a system bus, a data bus, an address bus, a PCI bus, a Mini-PCI bus, and any variety of local, peripheral, and/or independent buses.

With specific reference to FIG. 2A, illustrated is a scenario 200 in which the NED device 138 is rendering a first instance of a virtual scene 118(1) in association with a potential security incident 108. In the illustrated scenario 200, the first instance of the virtual scene 118(1) is being rendered in association with an alert 122 that has been triggered in response to an apparent brute force attack. For example, the alert 122 may have been generated based on a query 106 designed for analyzing the event log 104 to identify groupings of computing events that are indicative of a malicious actor having attempted to gain unauthorized access to computing resource(s) 130 via sequential login attempts utilizing many different passwords. In some implementations, the alert 122 may be initially presented via the display screen 144 and may include a virtual scene identifier 230 that uniquely corresponds to the identified security incident 108. As a specific example, the virtual scene identifier 230 may be in the form of a QUICK-RESPONSE CODE (QR code) that, upon being identified by the NED device 138, causes the NED device 138 to render the first instance of the virtual scene 118(1) that is shown in FIG. 2A. Thus, the virtual scene 118(1) may serve as an initial virtual scene from which the security analyst 134 begins an investigation into the security incident 108.

As illustrated, the virtual scene 118(1) includes a virtual scene object 202 that includes menu items 204 which may be selected by the security analyst 134 via physical gestures and/or voice commands. Here, the menu items 204 include a first menu item 204(1) that is selectable to cause all data sets 132 that are related to the security incident 108 under investigation to be added to the virtual scene 118. For example, if the specific query 108 that was utilized to identify the security incident 108 and trigger the alert 122 includes references to five data sets 132 named "A" through "E," a selection of the first menu item 204(1) may result in graphical control elements 136 for each of these five data sets to be added to the virtual scene 118.

The menu items 204 shown in FIG. 2A further include a second menu item 204(2) that is selectable to cause a virtual scene template 128 to be applied to the security incident 108 under investigation. Here, the security analyst 134 (represented as a hand in FIGS. 2A through 2D) is shown to be performing a physical gesture to "tap" on the second menu item 204(2) thereby instructing the security management system 102 to apply the corresponding virtual scene template 128.

In some implementations, various aspects of the virtual scene 118 being rendered by the NED device 138 may be positionally located in relation to a positional reference system 232 associated with the display screen 144. For example, as illustrated in FIG. 2A, the positional reference system 232 is a coordinate system that is spatially anchored to an upper-right corner of the screen-bound scene 142. In this way, the security analyst 134 can deliberately position various items of the virtual scene(s) 118 in relation to the display screen 144 so as to seamlessly utilize the virtual scene(s) 118 as a boundless extension of the screen-bound scene 142. As used herein, the term "screen-bound scene" refers to an area of computing generated imagery that is being generated by a display screen 144 such as, for example, a laptop computer monitor, a smartphone screen, a desktop computing monitor, a television screen, and various other types of non-wearable output devices. In contrast, as used herein, the term "virtual scene" refers to an area and/or volume of space in which computer generated imagery is being generated and/or can potentially be generated by a NED device 138 such as a augmented-reality or virtual-reality headset.

Figure 2B:
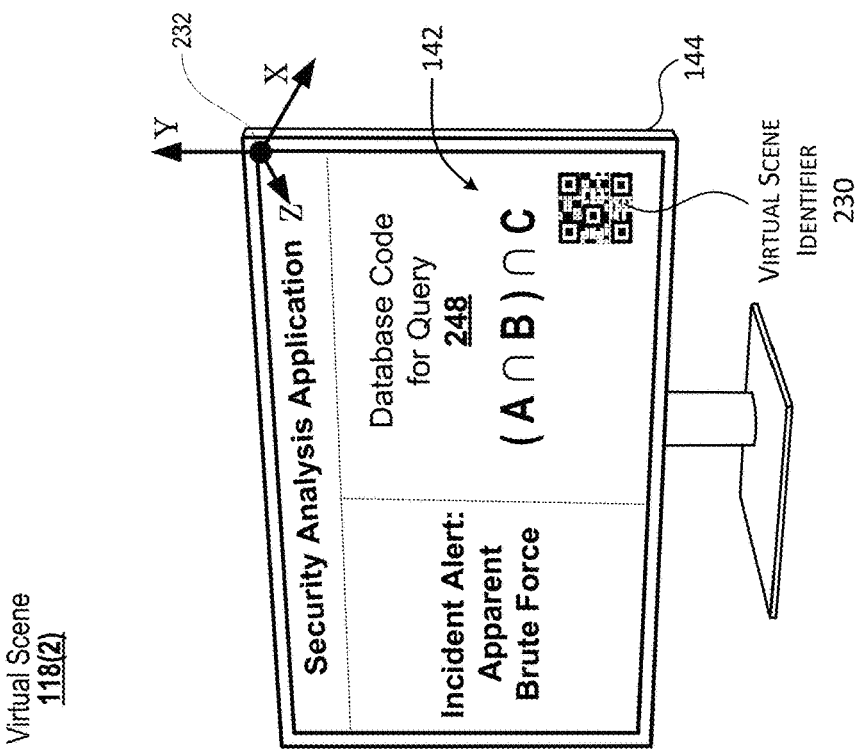
FIG. 2B illustrates another specific scenario in which the NED device is rendering a second instance of a virtual scene in accordance with a virtual scene template.
Figure 2B:
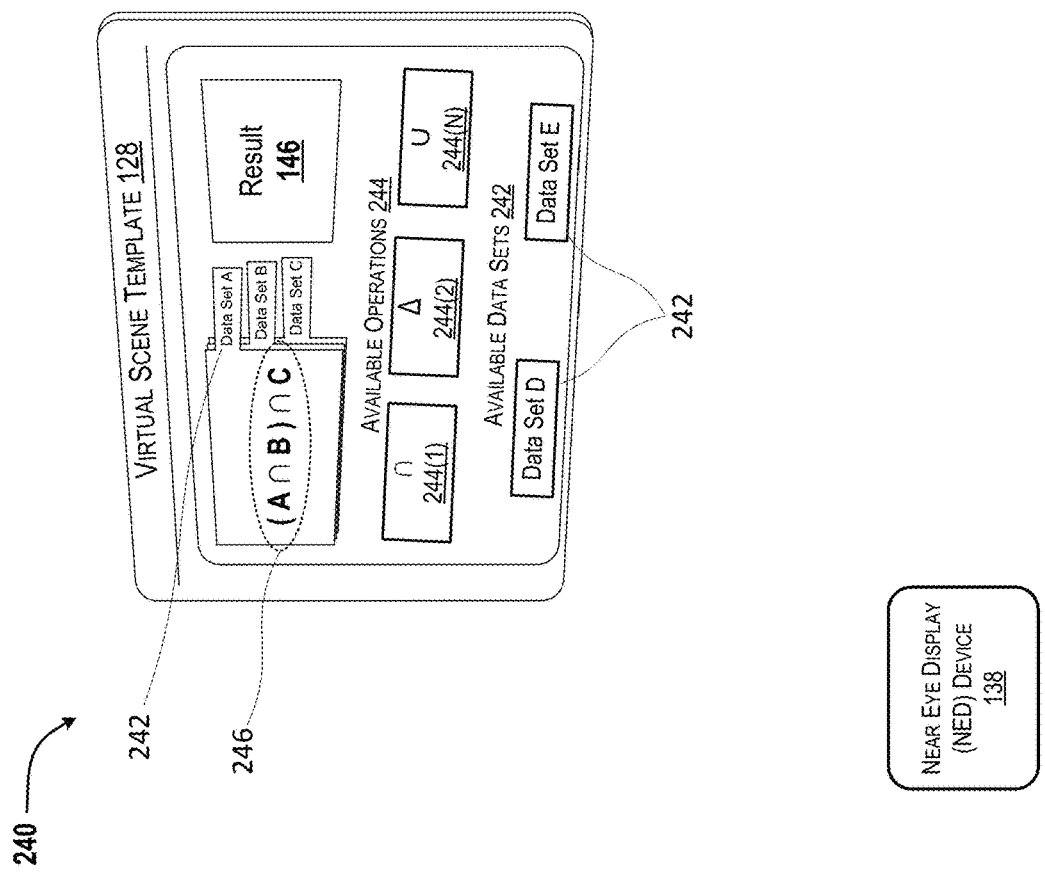

Turning now to FIG. 2B, illustrated is a scenario 240 in which the NED device 138 is rendering a second instance of a virtual scene 118(2) in association with the potential security incident 108. For example, the virtual scene 118(2) of scenario 240 may be rendered in accordance with the virtual scene template 128 that was selected by the security analyst 134 by "tapping" the second menu item 204(2) (e.g., as shown in FIG. 2A).

As illustrated, deployment of the virtual scene template 128 with respect to the security incident 108 under investigation may cause the security management service 102 to automatically perform a predefined data analysis operation 246 against one or more predefined data sets 132 that are relevant to the query 106. In the specifically illustrated example, simply by "tapping" the second menu item 204(2) shown in FIG. 2A, the security analyst 134 can seamlessly cause the result of the data analysis operation defined by "(A∩B)∩C" to be rendered within the virtual scene 118(2). As further illustrated, this user-input that is received in association with the virtual scene 118(1) may result in underlying database code 248 for the predefined data analysis query 246 to be displayed within the screen-bound scene 142.

Here, the virtual scene 118(2) includes various graphical control elements 242 that represent various data sets 132. Specifically, the virtual scene 118(2) includes five graphical control elements 242 representing five different data sets named "A" through "E." Additionally, the virtual scene 118(2) further includes various other graphical control elements that represent available operations 244 that can be deployed to analyze data sets "A" through "E"—either individually or in combination. Specifically, the virtual scene 118(2) includes a first graphical control element 244(1) that is selectable to deploy a first data analysis operation, a second graphical control element 244(2) that is selectable to deploy a second data analysis operation, and an Nth graphical control element 244(N) that is selectable to deploy an Nth data analysis operation.

Figure 2C:
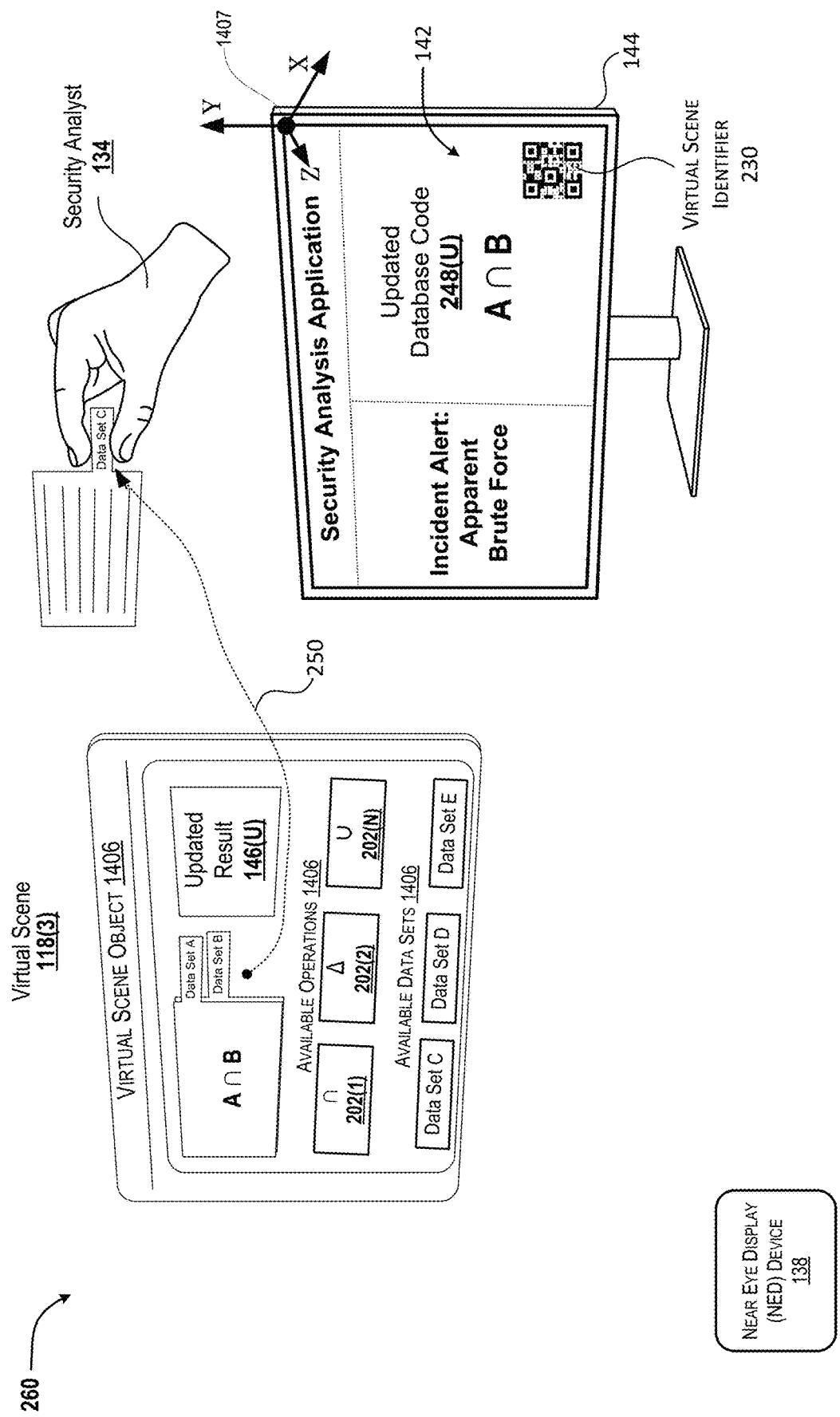
FIG. 2C illustrates another specific scenario in which the security analyst is performing a physical gesture on a "virtual" graphic control element to adjust aspects of a data analysis operation for which a result is displayed within the virtual scene.

Turning now to FIG. 2C, illustrated is a scenario 260 in which the security analyst 134 is performing a first physical gesture in association with a graphical control element to adjust aspects of information being displayed within a third instance of the virtual scene 118(3). Specifically, in scenario 260, the security analyst 134 is performing a "pinching" physical gesture to virtually "pinch" a graphical control element representing the data set "C" that has been utilized in the predefined data analysis operation 246. While virtually "pinching" this graphical control element, the security analyst 134 pulls data set "C" along the path 250 away from Data Sets "A" and "B" as represented in relation to predefined data analysis operation 246. As a result of the illustrated combination of the "pinching" gesture and the movement along the path 250, the security analyst 134 seamlessly causes the security management system 102 to dynamically update the predefined data analysis operation 246. For example, the simple physical gesture illustrated in FIG. 2C might cause the data analysis operation 246 to be updated from "(A∩B)∩C" as shown in the second virtual scene 118(2) to "A∩B" as shown in the third virtual scene 118(3)—all without having to manually adjust any of the data structure(s) and/or table query language(s) underlying the data analysis operation 246.

Scenario 260 further illustrates that the physical gesture which is performed in relation to the virtual scene 118(3) automatically causes the underlying database code 248 to be adjusted within the screen-bound scene 142 to updated database code 248(U). As shown in FIG. 2C, this updated/adjustment to the code 248 causes a result 146 being rendered within the virtual scene 118 to be updated to an updated result 146(U). After performing the illustrated gesture and the updated result 146(U) being rendered via the virtual scene 118, the security analyst 134 may choose to further adjust the updated database code 248(U) via traditional input methods (e.g., via a keyboard and/or mouse) provided to the security management system in relation to the display screen 144. Thus, it can be appreciated that in some implementations the information being displayed to the security analyst 134 via the virtual scenes 118 serves a virtual counterpart to information being displayed via the display screen 144.

Figure 2D:
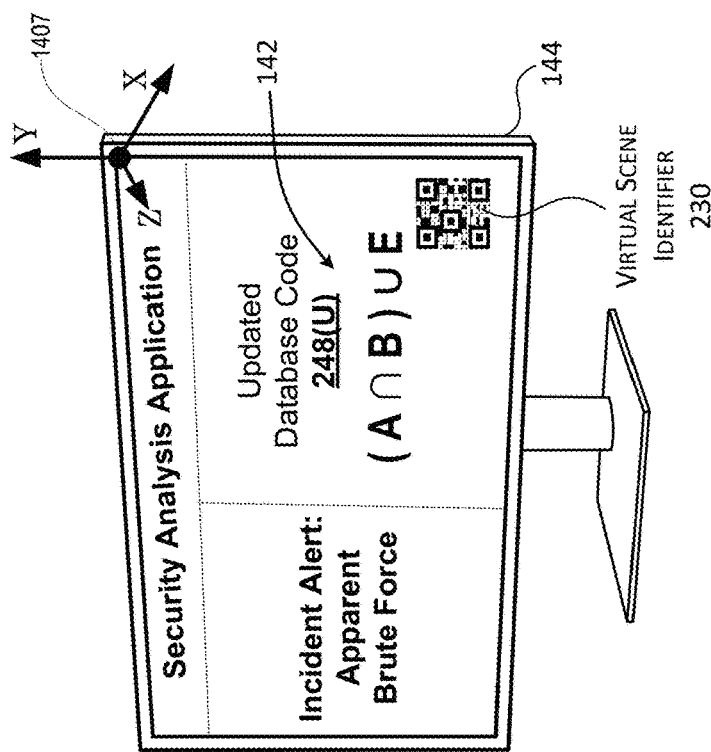
FIG. 2D illustrates another specific scenario in which the security analyst is performing yet another physical gesture to further adjust aspects of the data analysis operation.
Figure 2D:
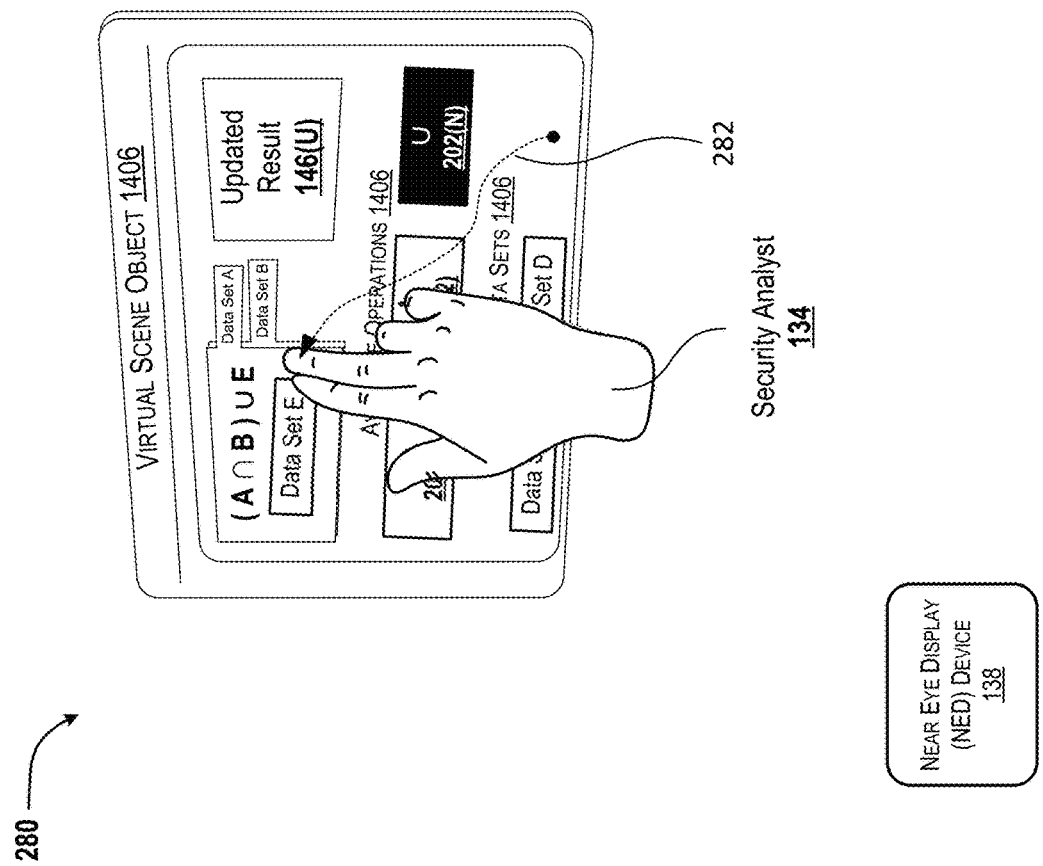

Turning now to FIG. 2D, illustrated is a scenario 280 in which the security analyst 134 is performing a second physical gesture in association with another graphical control element to adjust aspects of information being displayed within a fourth instance of the virtual scene 118(4). Specifically, in scenario 280, the security analyst 134 performs a "sliding" physical gesture to virtually "slide" a graphical control element representing the data set "E" onto the data analysis operation 246 (e.g., that was previously modified in as described in relation to FIG. 2C). For example, the security analyst 134 is shown to be placing a hand over the data set "E" graphical control element with only the index and middle finger extended. Based on the physical gesture commands 126 defined within the virtual scene data, the security management system 102 interprets this gesture as a user-input instruction for "virtually" sliding or moving the data set "E" graphical control element. Then, the security analyst 134 may move the hand along the path 282 while the security management system 102 continuously monitors this motion and causes the data set "E" graphical control element to "track" along with the hand within the virtual scene 118(4). Thus, from the visual perspective of the security analyst the graphical representation of data set "E" is being dynamically dragged through the virtual scene 118(4).

As a result of the illustrated combination of the "sliding" gesture and the movement along the path 282, the security analyst 134 seamlessly causes the security management system 102 to dynamically re-update the data analysis operation 246. For example, the simple physical gesture illustrated in FIG. 2D might cause the data analysis operation 246 to be updated from "A∩B" as shown in the third virtual scene 118(3) to "(A∩B)∪E" as shown in the fourth virtual scene 118(4)—once again without having to manually adjust complex data structure(s) and/or table query language(s). As described above, sliding the data set onto the existing version of the data analysis operation 246 may result in the security analyst 134 being prompted for a selection from a listing of available operations 202. For purposes of FIG. 2D, the security analyst 134 has selected the Nth data analysis operation (e.g., a union operation). Similar to the scenario 260, scenario 280 also illustrates that a physical gesture performed in relation to a virtual scene 118 automatically causes the underlying database code 248 to be adjusted within the screen-bound scene 142 to updated database code 248(U).

Figure 2E:
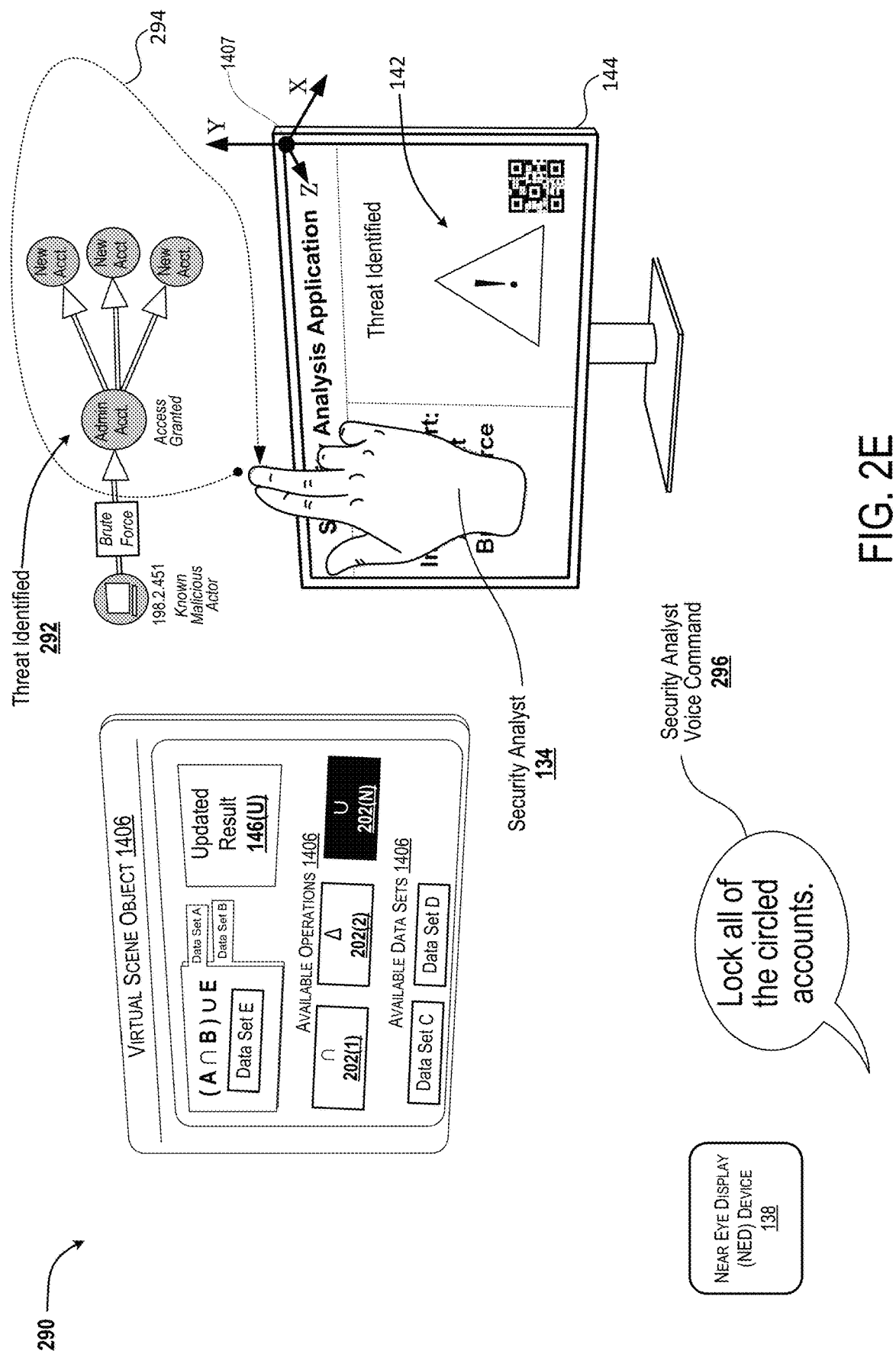
FIG. 2E illustrates a scenario in which the security analyst is performing another physical gesture in association with a graphical representation of an identified threat.

Turning now to FIG. 2E, illustrated is a scenario 290 in which the security analyst 134 is performing another physical gesture in association with a graphical representation 292 of an identified threat. As illustrated, the graphical representation 292 of the identified threat is being rendered by the NED device 138 within the virtual environment. As further illustrated, the physical gesture being performed by the security analyst 134 includes virtually drawing an enclosure around a grouping of computing resources associated with the identified threat. More specifically, the graphical representation 292 includes an identification of an IP address from which a known malicious actor has gained unauthorized access to an administrative account (e.g., a $1^{st}$ computing resource) by conducting a brute force attack. The graphical representation 292 of the identified threat further indicates that once access was obtained to the administrative account, the malicious actor performed a series of "lateral moves" by creating various new accounts.

It can be appreciated that in order to mitigate the identified threat, it may be desirable to perform an immediate remedial action of locking each newly created account in addition to the administrative account. In some implementations, such a remedial action can be performed by a combination of physical gestures (e.g., hand movements and/or eye gaze direction movements) and voice commands. For example, as illustrated in FIG. 2E, the security analyst 134 has "drawn" a virtual enclosure around the compromised computing resources (i.e., the breached administrative account and the newly created accounts) by moving a hand along a path 294 around these resources within the virtual scene. In this way, the security analyst 134 can quickly select these computing resource against which some remedial action is desired.

As further illustrated, the security analyst 134 provides a voice command 296 that defines or otherwise is indicative of the desired remedial action. In particular, the security analyst 134 verbally states "Lock all of the circled accounts." In this example, the security analyst 134 can quickly lock down (e.g., change/restrict access permissions of) the compromised computing resources based on a quickly performed combination of physical gestures and voice commands.

Figure 3B:
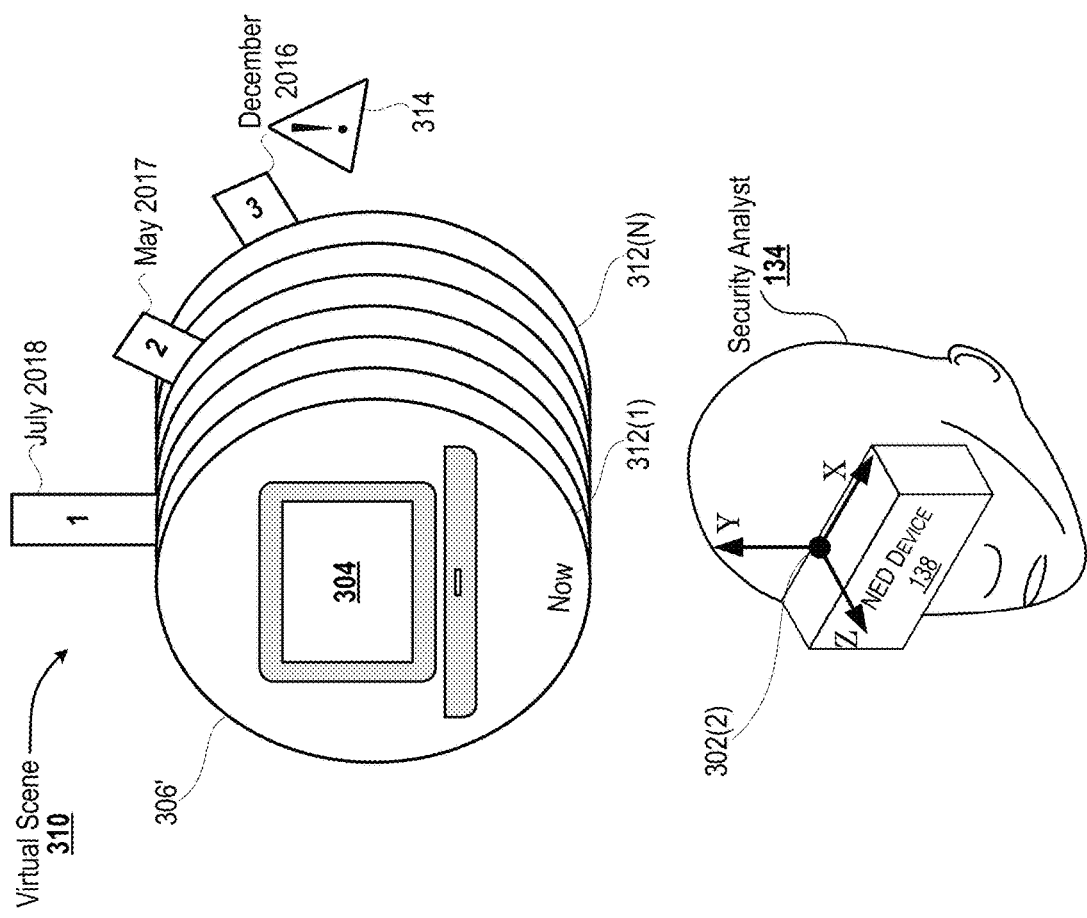
FIG. 3B illustrates an instance of an alternate virtual scene that is being rendered as a result of the coordinate system of FIG. 3A moving into a second orientation.
Figure 3A:
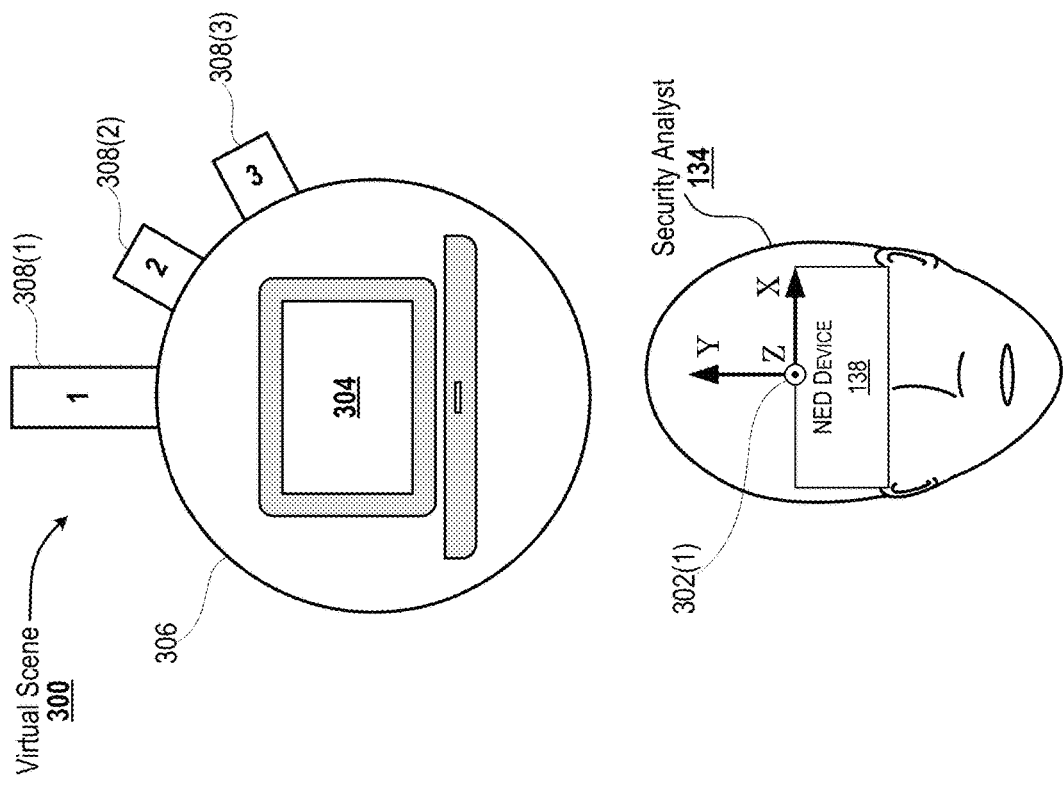
FIG. 3A illustrates an instance of a virtual scene that is being rendered as a result of a reference coordinate system associated with the security analyst being in a first orientation.

FIGS. 3A and 3B are related figures that illustrate how the techniques and systems described herein may respond to certain detected movements and/or gestures being performed by the security analyst 134 (e.g., who may also be referred to herein as simply a "user") adjusting an amount of and/or type of information being displayed within various instances of a virtual scene. FIGS. 3A and 3B are described in the context of a NED device being caused to render more or less information within a virtual scene depending on an orientation of a security analysts 134 head (e.g., as measured by a sensor within the NED device 138). However, this specific scenario is provided for illustrative purposes only and is not intended to be limiting of the scope appended claims and/or applicability of the disclosed techniques to other scenarios.

Referring specifically to FIG. 3A, illustrated is an instance of a virtual scene 300 that is being rendered as a result of a reference coordinate system associated with the security analyst 134 being in a first orientation 302(1). For example, as illustrated in FIG. 3A the coordinate system is oriented with a Y-axis in a vertical orientation, an X-axis in a horizontal orientation, and a Z-axis in a straight on (e.g., out of the page orientation). It will be appreciated that the orientation of the coordinate system may be an orientation of a NED device 138 that is being worn by the security analyst 134 and which is being tracked by one or more sensors (e.g., accelerometers, gyroscopes, etc.) installed within the NED device 138. Here, at a first time $T_1$ corresponding to FIG. 3A, the NED device 138 is rendering a first instance 300 of a virtual scene that includes a virtual graphic 306 representing one or more computing events that have occurred with respect to a computing resource 304. Specifically, the virtual graphic includes a first graphical tag 308(1) that represents a first computing event, a second graphical tag 308(2) that represents a second computing event, and a third graphical tag 308(3) that represents a third computing event. Here, although the virtual graphic 306 does convey that three notable computing events have occurred, the virtual graphic 306 does not convey when these computing events occurred or a relative frequency of the notable computing events with respect to other more mundane (e.g., less noteworthy) computing events.

Referring specifically now to FIG. 3B, illustrated is an instance of an alternate virtual scene 310 that is being rendered as a result of the coordinate system moving into a second orientation 302(2). As illustrated, for example, the security analyst 134 may have tilted his or her head at a second time $T_2$, thereby causing an adjusted virtual graphic 306' to be rendered (e.g., at least until the coordinate system returns to the first orientation 302(1)). The adjusted virtual graphic 306' includes aspects of additional information which were not previously graphically represented in the "initial" virtual graphic 306 shown in FIG. 3A. For example, the adjusted virtual graphic 306' has been dynamically updated to show an offset side view of a stack of multiple graphic objects 312(1) through 312(N). Individual ones of the graphic objects may represent individual different computing events that have occurred with respect to the computing resource 304. As illustrated in FIG. 3B, the result of the security analyst 134 tilting his or her head is to cause the adjusted virtual graphic 306' to convey aspects of time dimensionality associated with when individual ones of the notable computing events (e.g., as identified by the graphical tags 308) have occurred. For example, the third computing event identified by the third graphical tag 308(3) occurred in December 2016 whereas the first computing event identified by the first graphical tag 308(1) occurred later in July 2018. In addition to conveying time dimensionality, adjustments to the orientation 302 of the NED device 138 may also cause additional types of information to be displayed. For example, as illustrated, the change of the NED device 138 from the first orientation 302(1) to the second orientation 302(2) causes a warning icon 314 to be exposed in association with the third computing event (e.g., to indicate a relative severity of this computing event in relation to other computing events).

Figure 4:
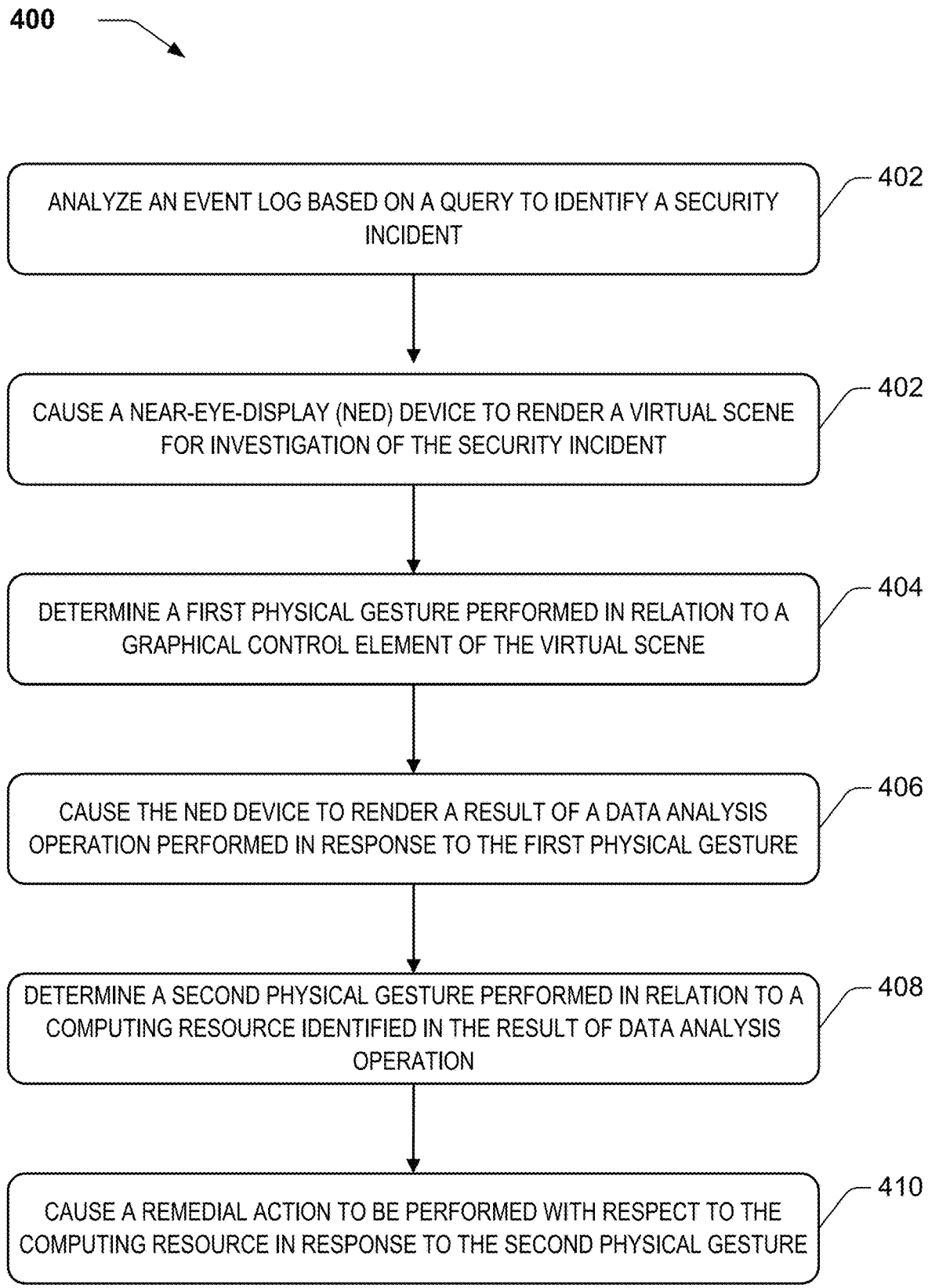
FIG. 4 illustrates a process is describe that facilitates fast and intuitive data manipulation within a virtual scene by tracking and responding to physical gestures that are performed by a security analyst are described.

Turning now to FIG. 4, a process 400 is describe that facilitates fast and intuitive data manipulation within a virtual scene by tracking and responding to physical gestures that are performed by a security analyst are described. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The process 400 begins at operation 402 where a system analyzes, based on a query, one or more data sets of an event log to identify a security incident that has occurred with respect to one or more computing resources.

Then, at operation 404 where the system causes a Near-Eye-Display (NED) device to render a virtual scene for investigating a security incident. An exemplary virtual scene may include, for example, various graphical control elements representing data sets and/or data analysis operations that are usable for investigating the security incident. As described above, the graphical control elements may be presented in a manner such that physical gestures performed by a user (e.g., the security analyst 134) to drag, tap-on, slide, stack, or otherwise manipulate within the virtual environment may be interpreted as user input.

In this regard, at block 406 the system determines that the user has performed a first physical gesture in relation to a particular graphical control element being rendered by the NED device within the virtual scene. For example, as described in relation to FIGS. 2C and 2D, the user may add or remove references to particular data sets within a data analysis operation by dragging such data sets toward and/or away from other data sets within the virtual environment.

At block 408, the system causes the NED device to render a result of some data analysis operation that is defined by and/or performed in response to the first physical gesture. As described in relation to FIG. 2E, in some instances the result of the data analysis operation may include an indication of one or more computing resources (e.g., a user account that is breached by a brute force attack).

At block 410, the system determines a second physical gesture that is performed in relation to at least one particular computing resource identified within the result being rendered by the NED device. For example, as shown in FIG. 2E, a user may gesture a circle around the at least one particular computing resource.

At block 412, the system causes a remedial action to be performed with respect to the at least one particular computing resource. For example, as further described in relation to FIG. 2E, the user may recite a verbal command to lock out the particular computing resource, thereby causing an administrative account to become locked so as to prevent potential malicious action from being performed via this administrative account.

Figure 5:
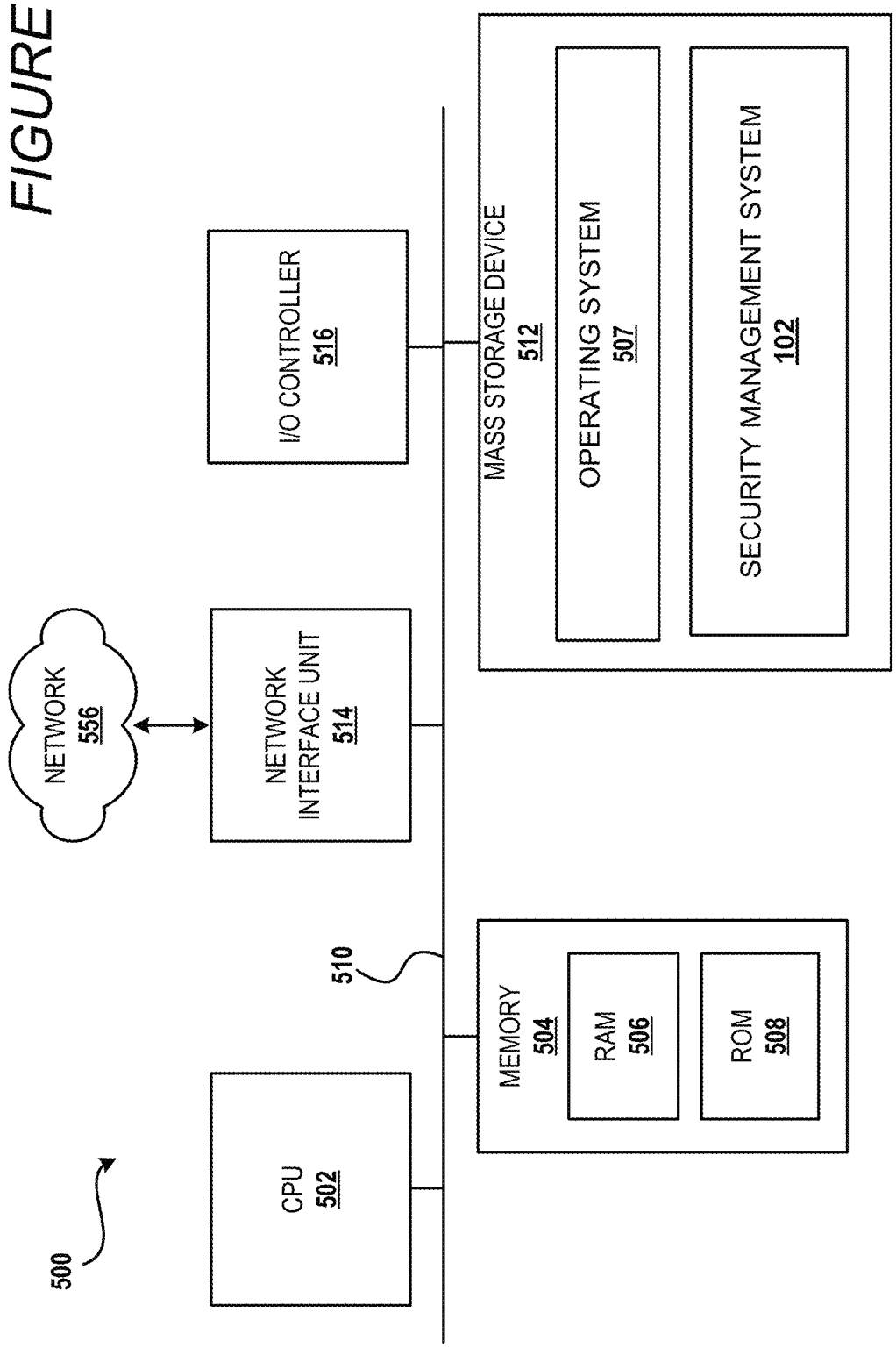
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as such as a server and/or server cluster, capable of executing the program components described herein. Thus, the computer architecture 500 illustrated in FIG. 5 illustrates an architecture for a server computer, a mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more applications, such as the analysis module 129. The mass storage device 512 can also store computer-executable instruction for implementing the security management system 102.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Turning now to FIG. 6, an illustrative computing device architecture 600 for a computing device that is capable of executing various software components described herein for enabling the techniques disclosed herein. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 600 is applicable to any of the computing devices shown in FIG. 1 and FIG. 7. Moreover, aspects of the computing device architecture 600 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 804, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some configurations, the processor 602 is fabricated, in part, utilizing a package-on-package ("PoP") integrated circuit packaging technique. The processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 and/or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available as a total combined storage capacity. In some configurations, the total combined capacity of the integrated storage 618 and the removable storage 620 is shown to a user instead of separate storage capacities for the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 656 or another network, which may be a WWAN, a WLAN, or a WPAN. Although only the network 656 is illustrated, the network connectivity components 606 may facilitate simultaneous communication with multiple networks, including the network 604 of FIG. 6. For example, the network connectivity components 606 may facilitate simultaneous communications with multiple networks via one or more of a WWAN, a WLAN, or a WPAN.

The network 656 may be or may include a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 656 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 656 may be configured to provide voice and/or data communications with any combination of the above technologies. The network 656 may be configured to or adapted to provide voice and/or data communications in accordance with future generation technologies.

In some configurations, the WWAN component 622 is configured to provide dual-multi-mode connectivity to the network 656. For example, the WWAN component 622 may be configured to provide connectivity to the network 656, wherein the network 656 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 656 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 656 via the WI-FI access points. Such connections may be secured via various encryption technologies including, but not limited, WI-FI Protected Access ("WPA"), WPA2, Wired Equivalent Privacy ("WEP"), and the like.

The network 656 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some configurations the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some configurations, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some configurations, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 632 are contemplated.

The accelerometer 634 is configured to measure proper acceleration. In some configurations, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some configurations, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some configurations, output from the gyroscope 636 is used by an application program as an input mechanism to control some functionality of the application program. For example, the gyroscope 636 can be used for accurate recognition of movement within a 3D environment of a video game application or some other application. In some configurations, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems. The GPS sensor 638 can also operate in conjunction with other components, such as the processor 602, to generate positioning data for the computing device 600.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some configurations, the display 640 and the touchscreen 642 are combined. In some configurations two or more of the data I/O component 644, the audio I/O component 646, and the video I/O component 648 are combined. The I/O components 610 may include discrete processors configured to support the various interface described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 640 is a liquid crystal display ("LCD") utilizing any active or passive matrix technology and any backlighting technology (if used). In some configurations, the display 640 is an organic light emitting diode ("OLED") display. Other display types are contemplated.

The touchscreen 642, also referred to herein as a "touch-enabled screen," is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 642 is incorporated on top of the display 640 as a transparent layer to enable a user to use one or more touches to interact with objects or other information presented on the display 640. In other configurations, the touchscreen 642 is a touch pad incorporated on a surface of the computing device that does not include the display 640. For example, the computing device may have a touchscreen incorporated on top of the display 640 and a touch pad on a surface opposite the display 640.

In some configurations, the touchscreen 642 is a single-touch touchscreen. In other configurations, the touchscreen 642 is a multi-touch touchscreen. In some configurations, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some configurations, the touchscreen 642 supports a tap gesture in which a user taps the touchscreen 642 once on an item presented on the display 640. The tap gesture may be used for various reasons including, but not limited to, opening or launching whatever the user taps. In some configurations, the touchscreen 642 supports a double tap gesture in which a user taps the touchscreen 642 twice on an item presented on the display 640. The double tap gesture may be used for various reasons including, but not limited to, zooming in or zooming out in stages. In some configurations, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some configurations, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some configurations, the touchscreen 642 supports a flick gesture in which a user swipes a finger in the direction the user wants the screen to move. The flick gesture may be used for various reasons including, but not limited to, scrolling horizontally or vertically through menus or pages. In some configurations, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some configurations, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 646 is configured to provide audio input and/or output capabilities to the computing device. In some configurations, the audio I/O interface component 646 includes a microphone configured to collect audio signals. In some configurations, the audio I/O interface component 646 includes a headphone jack configured to provide connectivity for headphones or other external speakers. In some configurations, the audio I/O interface component 646 includes a speaker for the output of audio signals. In some configurations, the audio I/O interface component 646 includes an optical audio cable out.

The video I/O interface component 648 is configured to provide video input and/or output capabilities to the computing device. In some configurations, the video I/O interface component 648 includes a video connector configured to receive video as input from another device (e.g., a video media player such as a DVD or BLURAY player) or send video as output to another device (e.g., a monitor, a television, or some other external display). In some configurations, the video I/O interface component 648 includes a High-Definition Multimedia Interface ("HDMI"), mini-HDMI, micro-HDMI, DisplayPort, or proprietary connector to input/output video content. In some configurations, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some configurations, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some configurations, the battery gauge 654 is configured to measure the effect of a battery's discharge rate, temperature, age and other factors to predict remaining life within a certain percentage of error. In some configurations, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via an I/O component.

Example Clauses

Example Clause A, a computer-implemented method, comprising: analyzing, based on a query, one or more data sets of an event log to identify a security incident that has occurred with respect to one or more computing resources; causing a near-eye-display (NED) device to render a virtual scene in association with the security incident, the virtual scene including graphical control elements that represent the one or more data sets; receiving, from at least one sensor of the NED device, gesture tracking data that is associated with a user of the NED device; determining, based on the gesture tracking data, a physical gesture command that is performed by the user with respect to a particular graphical control element that is being rendered within the virtual scene; and responsive to the physical gesture command being performed, deploying a data analysis operation in association with at least one particular data set that is graphically represented by the particular graphical control element.

Example Clause B, the computer-implemented method of Example Clause A, wherein the particular graphical control element is a first graphical control element that represents a first particular data set, and wherein the physical gesture command includes manipulating, within the virtual scene, a virtual location of the first graphical control element with respect to a second graphical control element that represents a second particular data set.

Example Clause C, the computer-implemented method of any one of Example Clauses A through B, wherein the manipulating the virtual location includes moving the first graphical control element that represents the first particular data set toward the second graphical control element that represents the particular second data set.

Example Clause D, the computer-implemented method of any one of Example Clauses A through C, wherein the manipulating the virtual location includes moving the second graphical control element that represents the second particular data set away from the first graphical control element that represents the particular first data set.

Example Clause E, the computer-implemented method of any one of Example Clauses A through D, further comprising causing a display screen to render a screen-bound scene in association with the security incident concurrently while the NED device renders the virtual scene.

Example Clause F, the computer-implemented method of any one of Example Clauses A through E, further comprising: receiving user input in association with one or more other graphical control element that is being rendered, by the display screen, within the screen-bound scene, and responsive to the user input, causing the NED device to begin rendering the graphical control elements that represent the one or more data sets within the virtual scene.

Example Clause G, the computer-implemented method of any one of Example Clauses A through F, further comprising: updating aspects of the screen-bound scene, that is being rendered in association with the security incident, based on the data analysis operation that is deployed responsive to the physical gesture command performed by the user with respect to the particular graphical control element being rendered within the virtual scene.

Example Clause H, the computer-implemented method of any one of Example Clauses A through G, further comprising: monitoring a relative orientation of the NED device with respect to a positional reference associated with the display screen; and based on the monitoring the relative orientation, maintaining relative positions of the graphical control elements, that represent the one or more data sets within the virtual scene, with respect to the screen-bound scene being rendered in association with the security incident.

Example Clause I, the computer-implemented method of any one of Example Clauses A through H, further comprising: receiving, from the at least one sensor, additional gesture tracking data that is associated with the user; determining, based on the additional gesture tracking data, an additional physical gesture command that is performed by the user with respect to a result of the data analysis operation; and responsive to the additional physical gesture command, performing a remedial action with respect to the one or more computing resources to resolve the security incident.

Example Clause J, a system comprising: one or more processing units; and a computer-readable storage medium having computer-executable instructions stored thereupon, which, when executed by the one or more processing units, cause the one or more processing units to: cause a near-eye-display (NED) device to render a virtual scene that includes graphical control elements representing one or more data sets associated with a security incident that has been detected in association with a computing resource; receive, from at least one sensor of the NED device, first gesture tracking data that indicates a first physical gesture command performed, by a user of the NED device, with respect to the graphical control elements; responsive to receiving the first gesture tracking data, cause the NED device to display a result of a data analysis operation that is performed in association with the one or more data sets; receive, from the at least one sensor of the NED device, second gesture tracking data that indicates a second physical gesture command performed, by the user, with respect to the result of the data analysis operation; and responsive to the second gesture tracking data, cause a remedial action to be performed with respect to the computing resource to resolve the security incident.

Example Clause K, the system of Example Clause J, wherein the first physical gesture command includes manipulating, within the virtual scene, a virtual location of a first graphical control element that represents a first data set with respect to a second graphical control element that represents a second data set.

Example Clause L, the system of any one of Example Clauses J through K, wherein the computer-executable instructions further cause the one or more processing units to: responsive to the manipulating the virtual location of the first graphical control element that represents the first data set with respect to the second graphical control element that represents the second data set, cause the NED device to update the virtual scene to include a listing of data analysis operations that are available for analyzing the first data set with respect to the second data set.

Example Clause M, the system of any one of Example Clauses J through L, wherein the computer-executable instructions further cause the one or more processing units to cause a display screen to render a screen-bound scene in association with the security incident concurrently while the NED device renders the virtual scene.

Example Clause N, the system of any one of Example Clauses J through M, wherein aspects of the virtual scene are spatially anchored with respect to the screen-bound scene.

Example Clause O, the system of any one of Example Clauses J through N, wherein the computer-executable instructions further cause the one or more processing units to update the screen-bound scene, that is being rendered in association with the security incident, based on the first physical gesture command being performed, by the user of the NED device, with respect to the graphical control elements within the virtual scene.

Example Clause P, the system of any one of Example Clauses J through O, wherein the remedial action that is performed responsive to the second gesture tracking data includes adjusting access permissions for the computing resource.

Example Clause P, a computer-implemented method, comprising: causing display device to render a virtual scene in association with a security incident, the virtual scene including graphical control elements that represent one or more data sets that triggered an alert for the security incident; receiving, from at least one sensor, gesture tracking data that is associated with a user; determining, based on the gesture tracking data, a physical gesture command that is performed by the user with respect to a particular graphical control element that is being rendered within the virtual scene; and responsive to the physical gesture command being performed, causing a remedial action to be performed with respect to a computing resource to resolve the security incident.

Example Clause Q, the computer-implemented method of Example Clause P, wherein the causing the remedial action to be performed is further based on a voice-input received in association with the computing resource.

Example Clause R, the computer-implemented method of any one of Example Clauses P though Q, wherein the remedial action includes adjusting access permissions for the computing resource.

Example Clause S, the computer-implemented method of any one of Example Clauses P though R, wherein aspects of the virtual scene are spatially anchored with respect to a display screen on which the alert is presented.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

Techniques disclosed herein are believed to be applicable to a variety of systems and approaches for generating virtual scenes in association with investigations of security incidents and remediations of identified security threats. Aspects of the disclosed techniques are described above predominantly in the context of a security analyst (e.g., a user) wearing an augmented-reality type (AR-type) head-mounted-display (HMD) device that generates imagery that is composited over the security analysts view of a real world environment (e.g., including a display screen). While the presently disclosed techniques are not necessarily limited to such AR-type HMD device applications, an appreciation of various aspects of the inventive and/or novel concepts are readily gained through a discussion of examples in such a context. However, other technologies for generating virtual scenes whether currently known or subsequently developed may also be deployed to implement the concepts described herein. For example, one or more non-wearable display generation components may be deployed to generate holographic images to generate various aspects of the virtual scene(s) described herein. An exemplary such non-wearable system may be comprised of, for example, a cubicle room in which a user stands and onto the walls of which various images are projected to create a virtual scene. Furthermore, in various implementations, one or more non-wearable (e.g., not affixed or otherwise mounted onto the user's person/body) sensors may be utilized to obtain gesture tracking data.

What is claimed is:

1. A computer-implemented method, comprising:
analyzing, based on a query, a plurality of data sets of an event log to identify a security incident that has occurred with respect to one or more computing resources;
causing a near-eye-display (NED) device to render a virtual scene so a user of the NED device can investigate the security incident, the virtual scene including a plurality of graphical control elements, wherein each of the plurality of graphical control elements represents one of the plurality of data sets;
causing a display screen of another display device to render a screen-bound scene in association with the security incident concurrently while the NED device renders the virtual scene;
receiving, from at least one sensor of the NED device, gesture tracking data that is associated with the user of the NED device;
determining, based on the gesture tracking data, a physical gesture command that is performed by the user with respect to a first graphical control element that is being rendered within the virtual scene; and
responsive to determining that the physical gesture command is performed, deploying a data analysis operation in association with a first data set that is represented by the first graphical control element.

2. The computer-implemented method of claim 1, wherein the physical gesture command includes manipulating, within the virtual scene, a virtual location of the first graphical control element with respect to a second graphical control element that represents a second data set.

3. The computer-implemented method of claim 2, wherein the manipulating the virtual location includes moving the first graphical control element that represents the first data set toward the second graphical control element that represents the second data set.

4. The computer-implemented method of claim 2, wherein the manipulating the virtual location includes moving the second graphical control element that represents the second data set away from the first graphical control element that represents the first data set.

5. The computer-implemented method of claim 1, further comprising causing a display screen to render a screen-bound scene in association with the security incident concurrently while the NED device renders the virtual scene.

6. The computer-implemented method of claim 5, further comprising:
receiving user input in association with one or more other graphical control elements that is being rendered, by the display screen, within the screen-bound scene; and
responsive to receiving the user input, causing the NED device to begin rendering the plurality of graphical control elements that represent the plurality of data sets within the virtual scene.

7. The computer-implemented method of claim 5, further comprising updating aspects of the screen-bound scene, that is being rendered in association with the security incident, based on the data analysis operation that is deployed responsive to the physical gesture command performed by the user with respect to the first graphical control element being rendered within the virtual scene.

8. The computer-implemented method of claim 5, further comprising:
monitoring a relative orientation of the NED device with respect to a positional reference associated with the display screen; and
based on the monitoring the relative orientation, maintaining relative positions of the plurality of graphical control elements with respect to the screen-bound scene being rendered in association with the security incident.

9. The computer-implemented method of claim 5, further comprising:
receiving, from the at least one sensor, additional gesture tracking data that is associated with the user;

determining, based on the additional gesture tracking data, an additional physical gesture command that is performed by the user with respect to a result of the data analysis operation; and responsive to determining that the additional physical gesture command is performed, performing a remedial action with respect to the one or more computing resources to resolve the security incident.

10. The computer-implemented method of claim 1, further comprising causing the NED device to render a listing of data analysis operations in the virtual scene, wherein each of the data analysis operations assists with investigating the security incident and the data analysis operation is selected from the listing of data analysis operations.

11. A system comprising:
one or more processing units; and
a computer-readable storage medium having computer-executable instructions stored thereupon, which, when executed by the one or more processing units, cause the one or more processing units to:
cause a near-eye-display (NED) device to render a virtual scene that includes a plurality of graphical control elements that respectively represent a plurality of data sets associated with a security incident that has been detected in association with a computing resource, the virtual scene enabling a user of the NED device to investigate the security incident;
cause a display screen of another display device to render a screen-bound scene in association with the security incident concurrently while the NED device renders the virtual scene;
receive, from at least one sensor of the NED device, first gesture tracking data that indicates a first physical gesture command performed, by the user of the NED device, with respect to a first graphical control element of the plurality of graphical control elements;
responsive to receiving the first gesture tracking data, cause the NED device to display a result of a data analysis operation that is performed in association with a first data set represented by the first graphical control element;
receive, from the at least one sensor of the NED device, second gesture tracking data that indicates a second physical gesture command performed, by the user of the NED device, with respect to the result of the data analysis operation; and
responsive to receiving the second gesture tracking data, cause a remedial action to be performed with respect to the computing resource to resolve the security incident.

12. The system of claim 11, wherein the first physical gesture command includes manipulating, within the virtual scene, a virtual location of the first graphical control element that represents the first data set with respect to a second graphical control element that represents a second data set.

13. The system of claim 12, wherein the computer-executable instructions further cause the one or more processing units to:
responsive to the manipulating the virtual location of the first graphical control element that represents the first data set with respect to the second graphical control element that represents the second data set, cause the NED device to update the virtual scene to include a listing of data analysis operations that are available for analyzing the first data set with respect to the second data set.

14. The system of claim 12, wherein aspects of the virtual scene are spatially anchored with respect to the screen-bound scene.

15. The system of claim 12, wherein the computer-executable instructions further cause the one or more processing units to update the screen-bound scene, that is being rendered in association with the security incident, based on the first physical gesture command being performed, by the user of the NED device, with respect to the plurality of graphical control elements within the virtual scene.

16. The system of claim 11, wherein the remedial action that is performed responsive to receiving the second gesture tracking data includes adjusting access permissions for the computing resource.

17. A computer-implemented method, comprising:
causing a display device to render a virtual scene in association with a security incident, the virtual scene including a plurality of graphical control elements that respectively represent a plurality of data sets that triggered an alert for the security incident, the virtual scene enabling a user of the display device to investigate the security incident;
wherein aspects of the virtual scene are spatially anchored with respect to a display screen of another display device on which the alert is concurrently being presented;
receiving, from at least one sensor, first gesture tracking data that is associated with the user;
determining, based on the first gesture tracking data, a first physical gesture command that is performed by the user with respect to a graphical control element that is being rendered within the virtual scene and that represents a data set;
performing a data analysis operation performed in association with the data set represented by the graphical control element based on the first physical gesture command;
displaying a result of the data analysis operation that is performed in association with the data set represented by the graphical control element;
receiving, from the at least one sensor, second gesture tracking data that is associated with the user;
determining, based on the second gesture tracking data, a second physical gesture command that is performed by the user with respect to the result of the data analysis operation; and
responsive to determining that the second physical gesture command is performed, causing a remedial action to be performed with respect to a computing resource to resolve the security incident.

18. The computer-implemented method of claim 17, wherein the remedial action includes adjusting access permissions for the computing resource.

* * * * *